US007669389B2

(12) United States Patent
Butler

(10) Patent No.: US 7,669,389 B2
(45) Date of Patent: Mar. 2, 2010

(54) TWO-WAY POSTAL MAILING ASSEMBLY

(75) Inventor: Todd N Butler, Cincinnati, OH (US)

(73) Assignee: Butler Leasing Corporation, Hamilton, OH (US)

(*) Notice: Subject to any disclaimer, the term of this patent is extended or adjusted under 35 U.S.C. 154(b) by 1255 days.

(21) Appl. No.: 11/160,496

(22) Filed: Jun. 27, 2005

(65) Prior Publication Data
US 2005/0224566 A1 Oct. 13, 2005

Related U.S. Application Data

(63) Continuation-in-part of application No. 10/912,990, filed on Aug. 6, 2004.

(60) Provisional application No. 60/525,328, filed on Nov. 26, 2003.

(51) Int. Cl.
B65B 11/48 (2006.01)

(52) U.S. Cl. .................. 53/460; 53/467; 53/284.3

(58) Field of Classification Search ........... 206/312, 206/308.1, 307, 307.1, 313, 445; 53/460, 53/467, 473, 569, 284.3
See application file for complete search history.

(56) References Cited

U.S. PATENT DOCUMENTS

| 3,726,471 | A | | 4/1973 | Kalb | 229/92.8 |
|---|---|---|---|---|---|
| 4,093,117 | A | | 6/1978 | Morse | 229/70 |
| 4,428,526 | A | | 1/1984 | Riley | 229/92.1 |
| 4,487,360 | A | | 12/1984 | Fisher et al. | 229/73 |
| 4,602,736 | A | | 7/1986 | Barr | 229/73 |
| 4,620,630 | A | * | 11/1986 | Moss | 206/45.24 |
| 4,653,639 | A | | 3/1987 | Traynor | 206/444 |
| 4,706,878 | A | | 11/1987 | Lubotta et al. | 229/73 |
| 4,936,769 | A | | 6/1990 | Schoenleber | 229/68.1 |
| 5,052,613 | A | | 10/1991 | Lin | 229/73 |
| 5,090,561 | A | * | 2/1992 | Spector | 206/308.1 |
| 5,288,014 | A | | 2/1994 | Meyers et al. | 229/304 |
| 5,353,931 | A | | 10/1994 | Antik | 206/232 |
| 5,396,987 | A | * | 3/1995 | Temple et al. | 206/309 |
| 5,458,273 | A | | 10/1995 | Schubert et al. | 229/304 |
| 5,460,265 | A | | 10/1995 | Kiolbasa | 206/308.1 |
| 5,487,826 | A | | 1/1996 | Back et al. | 206/308.3 |
| 5,620,097 | A | | 4/1997 | Timmons, II et al. | 206/521 |
| 5,713,605 | A | * | 2/1998 | Pace et al. | 281/38 |
| 5,749,463 | A | | 5/1998 | Collins | 206/308.1 |
| 6,073,673 | A | * | 6/2000 | Janutta | 160/199 |
| 6,126,201 | A | | 10/2000 | Pace et al. | 281/29 |
| 6,612,484 | B2 | * | 9/2003 | Rawlings et al. | 229/305 |
| 2002/0125305 | A1 | | 9/2002 | Abercrombie | |
| 2003/0000854 | A1 | * | 1/2003 | Jang | 206/308.1 |
| 2004/0046010 | A1 | | 3/2004 | Colvin, Jr. | |

(Continued)

OTHER PUBLICATIONS

Just Focus—The CD Business Card People, justfocus.com, Oct. 24, 2000, La Verne, California.

Primary Examiner—Thanh K Truong
(74) Attorney, Agent, or Firm—Wood, Herron & Evans, LLP

(57) ABSTRACT

Postal mailing assembly capable of being processed by postal processing equipment without causing damage to the article held by the mailer. The mailing assembly includes a pocket holding the article inside the mailer is offset relative to one edge of the assembly by a distance sufficient to prevent damage when the mailer is oriented and processed by postal equipment.

11 Claims, 24 Drawing Sheets

U.S. PATENT DOCUMENTS

2004/0050919 A1 3/2004 Calonje et al.
2004/0112789 A1 6/2004 Robinson
2004/0206808 A1 10/2004 Calonje et al.
2005/0072694 A1* 4/2005 Hodess et al. ............... 206/312

* cited by examiner

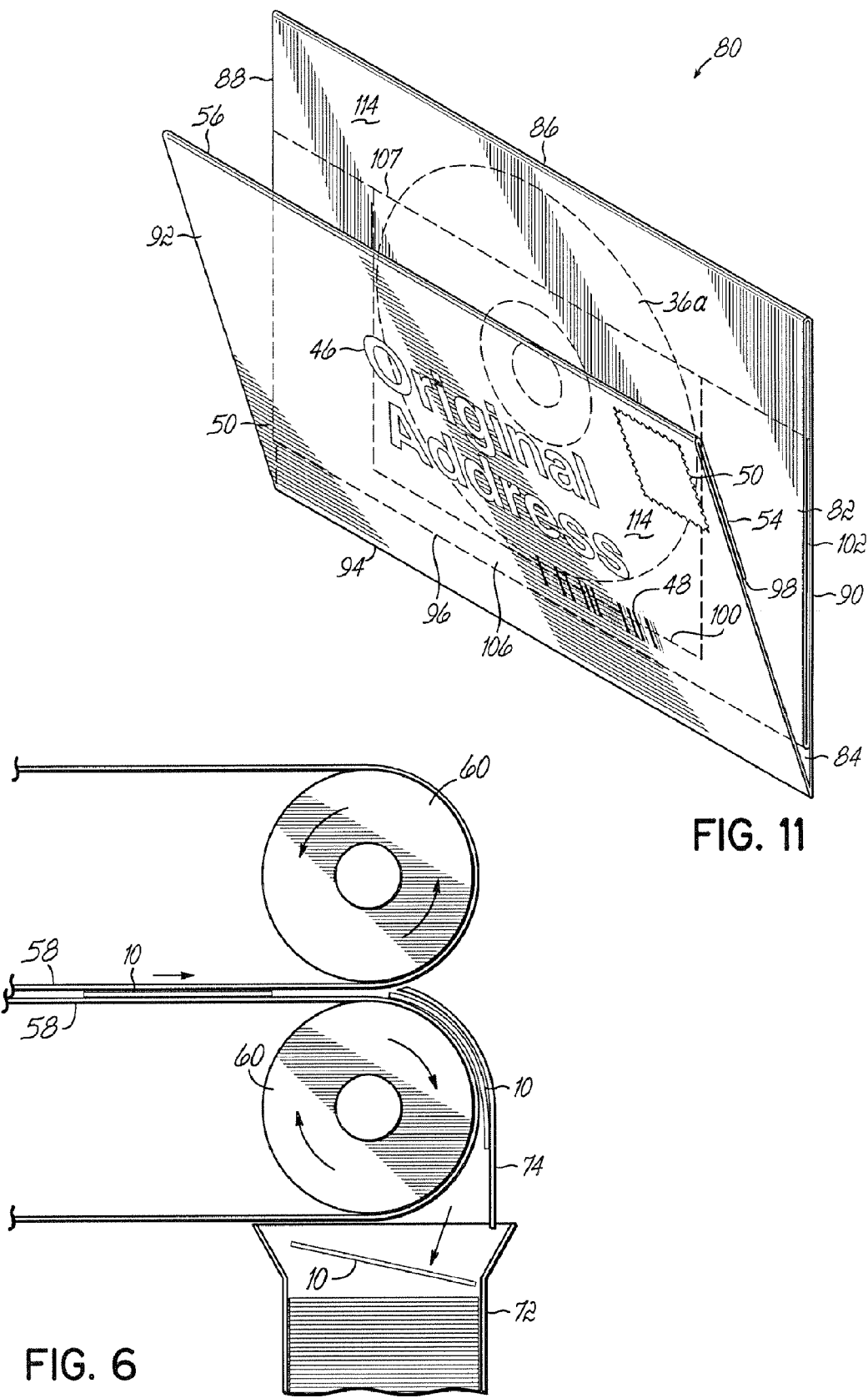

TWO-WAY POSTAL MAILING ASSEMBLY

CROSS-REFERENCE TO RELATED APPLICATIONS

This application is a continuation-in-part of application Ser. No. 10/912,990, which claims the benefit of U.S. Provisional Application No. 60/525,328 filed on Nov. 26, 2003, the disclosure of each of which is hereby incorporated by reference herein in its entirety.

FIELD OF THE INVENTION

The invention relates to mailers and, in particular, to mailers that are suitable for securing and protecting articles, such as stress-sensitive or frangible articles, for safe processing by automated processing equipment.

BACKGROUND OF THE INVENTION

The constructions of mailpieces and envelopes must conform to specified size and flexibility requirements. Postal services, like the United States Postal Service, sort large volumes of mail with high-speed automated processing equipment having pairs of vertical moving belts arranged in a network to grip and serially transport individual mailpieces at a speed of up to 40,000 pieces an hour. The moving belts convey the mailpieces, which are oriented vertically, at a linear velocity approaching 500 to 600 feet per minute. Each mailpiece is oriented in a vertical plane such that an edge portion of the mailpiece is gripped between the moving belts. An optical scanner provided adjacent to the moving belts identifies a destination address for each mailpiece. Mailpieces are sorted according to the destination address and routed by the network of moving belts into assorted bins or stackers.

Changes in direction of transported letter mail in automated processing equipment are accommodated by providing a pulley, roller or drum over which the moving belts are trained at the point where the direction change is to occur. For example, if the mailpiece is moving linearly in a horizontal direction and it is desired to effect a directional change to a different horizontal direction, a drum mounted for rotation about a vertical axis is placed at the change-of-direction point in the path of travel of the opposed belts between which the mailpiece is gripped for transport. As the belts move about the rotating drum, the mailpiece travels through a curved path conforming to the drum periphery and emerges traveling between the moving belts in a new horizontal direction.

Breakable, frangible or stress-sensitive articles, such as compact disks or mini-compact disks must be packaged inside a mailer. Letter-size mailers should comply with postal regulations, such as size requirements and address positioning, while protecting the stress-sensitive article from damage during sorting by the automated processing equipment. Moreover, postal regulations would require the mailer to be flexible enough to be bent and routed about the circumference of cylindrical pulleys, rollers and drums of the type used in automated processing systems at locations where directional changes occur in the travel path of the belts.

Conventional mailers would expose stress-sensitive articles to a significant risk of damage as the mailer is bent about the circumference of the cylindrical roller or drum. As the mailer is conveyed about the exterior of the pulley, roller or drum, the stress-sensitive article must curve or bow and will experience a state of tension due to the flexure that can damage or even break the article. Thus, because of this and other significant shortcomings, conventional letter-sized mailers do not adequately safeguard stress-sensitive articles when handled by automated processing equipment of the type used by the United States Postal Service.

If the dimensions of the mailer exceed a maximum dimension (e.g., oversized) as governed by postal regulations or does meet the flexibility requirements for letter sorting equipment, the United States Postal Service does not treat the mailer as a letter. Instead, the mailer is handled as a non-letter or flat by automated equipment that does not require routing about the exterior of a drum. Most mass mailings, however, are of pre-sorted, letter-sized mailers that are less expensive to mail.

Accordingly, there is a need for mailers and mailer assemblies for articles that can be handled by automated letter-sized processing equipment and that are fully compliant with postal regulations while simultaneously protecting the article from damage during processing.

SUMMARY OF THE INVENTION

The invention provides mailers configured to carry an article such that the mailer can be bent and transported in automated processing equipment with the article lifted out of contact or substantially out of contact with the belts, drums and other components of the processing equipment. In particular, the invention provides mailers for articles, such as stress-sensitive or frangible articles that are readily or easily damaged by stress, configured such that the mailer can be bent and transported in automated processing equipment without causing stress-related damage to the article. The invention also provides mailers for articles that positions the article such that the belts of the automated processing equipment do not contact the area of the mailer containing the article or, alternatively, does not contact the area of the mailer overlying more than half of the article. The invention further provides mailers for articles that can ensure damage-free processing by automated processing equipment of the postal service while securing the article during transit from a sender to a recipient.

In accordance with an embodiment of the invention, an assembly for mailing an article comprises an envelope and a mailer adapted to be inserted into the envelope. The mailer includes a first panel, a second panel joined to the first panel to define a first edge and a second edge, a pocket between the first and second panels, an access opening along a portion of the second edge for accessing the pocket to insert and remove the article, and a flap attached to the second edge and movable for closing the access opening to the pocket. The mailer further includes a false bottom adapted to space the pocket from the first edge by an amount sufficient to prevent damage to the article when the article is positioned in the pocket and the mailer and the envelope are processed by, for example, automated letter-sized postal equipment.

In accordance with another embodiment of the invention, an assembly for mailing an article comprises an envelope, a mailer adapted to be inserted into the envelope, and a sleeve positioned inside the pocket of the mailer. The mailer includes a first panel, a second panel, a pocket positioned between the first and second panels, an access opening to the pocket, and a flap attached to the first panel and movable relative to the second panel for closing the access opening to the pocket. The sleeve includes a first panel, a second panel joined to the first panel to define a first edge and a second edge, a pocket between the first and second panels, an access opening along a portion of the second edge for accessing the pocket to insert and remove the article, and a false bottom adapted to space the pocket from the first edge by an amount sufficient to prevent damage to the article when the article is positioned inside the sleeve, the sleeve is positioned inside the mailer and the sleeve, the mailer, and the envelope are processed by, for example, automated letter-sized postal equipment.

In accordance with another aspect of the invention, a method for mailing an article comprises placing the article inside a pocket of a mailing member having a false bottom adapted to space said pocket from an edge of the mailing member by an amount sufficient to prevent damage to the article during processing. The method further comprises inserting the mailing member inside an envelope with an original address visible from the exterior of the envelope.

The features and objectives of the invention will become more readily apparent from the following Detailed Description taken in conjunction with the accompanying drawings.

BRIEF DESCRIPTION OF THE FIGURES

The accompanying drawings, which are incorporated in and constitute a part of this specification, illustrate embodiments of the invention and, together with a general description of the invention given above, and the detailed description given below, serve to explain the principles of the invention.

FIG. 6 is a schematic top view of automated processing equipment processing the mailer of the invention at a location near a drum changing the direction of the belt path;

FIG. 11 is a perspective view illustrating the folding of the mailer of FIG. 9 for outbound mailing from a sender to a recipient with the original address visible and the resizing flap stowed for original mailing;

DETAILED DESCRIPTION

Figure 1:
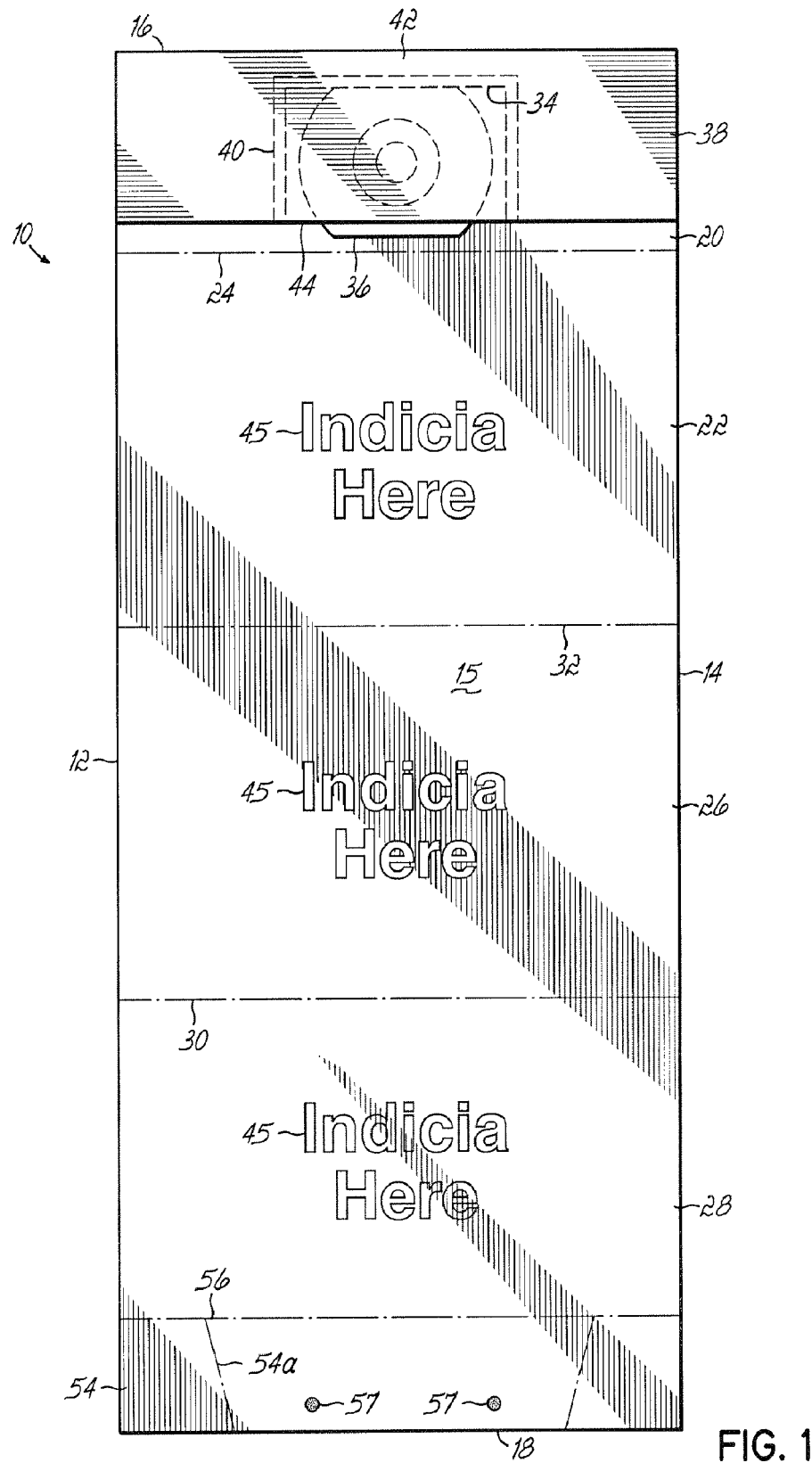
FIG. 1 is a rear view of an embodiment of a mailer in accordance with the invention in an unfolded state.
Figure 3:
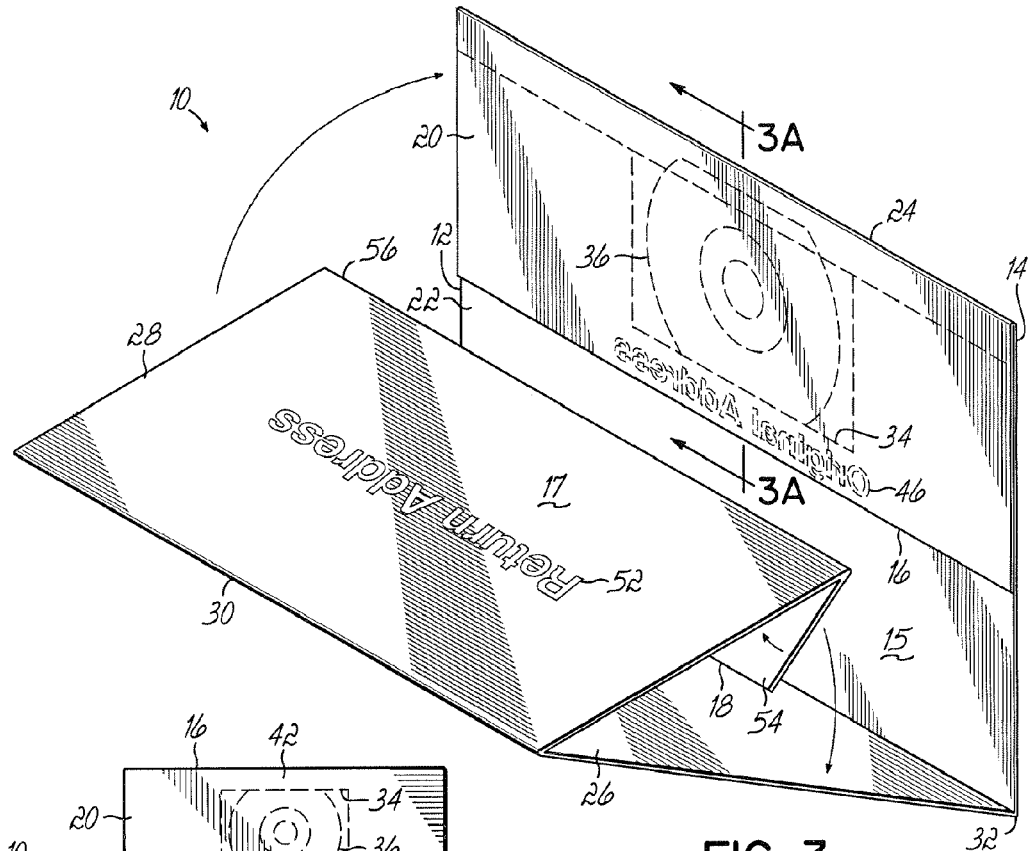
FIG. 3 is a perspective view illustrating the folding of the mailer of FIG. 1 for outbound mailing from a sender to a recipient with the original address visible, the return address hidden, and the resizing flap stowed for original mailing.
Figure 2:
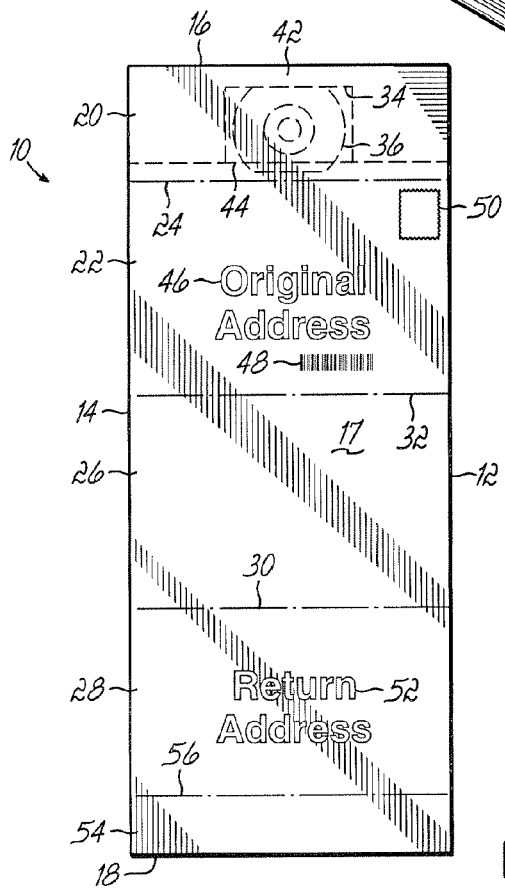
FIG. 2 is a front view of the mailer of FIG. 1.

With reference to FIGS. 1 and 2, a mailer 10 of the invention comprises a generally planar and generally rectangular sheet or blank having opposite side edges 12 and 14, a top edge 16, a bottom edge 18, a rear side 15 visible in FIG. 1, and a front side 17 visible in FIG. 2. Mailer 10 includes a first panel 20, a second panel 22 integrally joined along a transverse fold line 24 extending between side edges 12 and 14 with the first panel 20, a third panel 26, and a fourth panel 28 integrally joined along a transverse fold line 30 extending between side edges 12 and 14 with the third panel 26. The second and third panels 22, 26 are joined along a transverse fold line 32 extending between side edges 12 and 14. The fold lines 24, 30, and 32 are substantially transverse to the top and bottom edges 16, 18 and have a spaced relationship that divides the mailer 10 into panels 20, 22, 26, and 28. The term fold line is used herein to mean a weakened or scored portion of the blank for purposes of folding the blank.

Figure 3A:
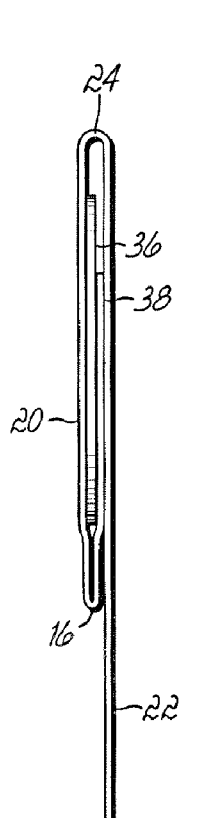
FIG. 3A is a cross-sectional view taken generally along line 3A-3A in FIG. 3.

Fold lines 24, 30, and 32 define lines of weakness along which panels 20, 22, 26, and 28 may be folded. The fold lines 24, 30, and 32 are defined such that panels 20, 22, 26 and 28 have a preferred folding direction. Although not required, the directionality may be provided by appropriately scoring fold lines 24, 30, and 32. The mailer 10 has an open or unfolded position, shown in FIG. 1, wherein the panels 20, 22, 26, and 28 are adjacent to each other in substantially the same plane and a closed or folded position, shown in FIG. 4, wherein the panels 20, 22, 26, and 28 are folded non-accordion style into a more compact configuration suitable for mailing. The invention contemplates that the top edge 16 may constitute another fold line, as shown in FIG. 3A, or may be the non-joined individual free ends of panels 20 and 38.

With continued reference to FIGS. 1 and 2, the mailer 10 includes a pouch or pocket 34 defined near the top edge 16 that is configured to hold and protect an article 36. The pocket 34 is defined as a space between the first panel 20 and a fifth panel 38 by adhesively bonding confronting surface areas of the first and fifth panels 20, 38 with adhesive 40. Panel 38 is adhesively bonded to the rear side 15 of the mailer 10. The adhesive 40 defines lateral boundaries for pocket 34 and an edge boundary connecting the lateral boundaries proximate and substantially parallel to the top edge 16. The adhesive 40 may have many different configurations as understood by persons of ordinary skill in the art, such as adhesive beads, adhesive dots, adhesive blocks or strips, or a thin layer of a coadhesive applied to the panels 20, 38, and is not limited to the illustrated strips.

The distance between the top edge 16 and the edge boundary of pocket 34 defines a false bottom, generally indicated by reference numeral 42, for pocket 34. The pocket 34 includes an access opening 44 opposite to the false bottom 42 that is oriented to face substantially toward the fold line 24 and that is dimensioned between the lateral boundaries of pocket 34 to receive the article 36 therethrough for positioning within pocket 34. In certain embodiments contingent upon the size of the article 36, panel 20 is shorter, as measured between top edge 16 and fold line 24, in a direction extending between the top and bottom edges 16 and 18 than panels 22, 26, and 28 as measured between adjacent fold lines. The first and fifth panels 20, 38 may be integral along the top edge 16 and joined along a fold line, as shown, or the fifth panel 38 may be a separate sheet from first panel 20. When the mailer 10 is in a folded condition or state, the pocket 34 and the article 36 are substantially inaccessible from the exterior of the mailer 10 without unsealing and unfolding the mailer 10.

The dimensions of the pocket 34 are predetermined to accommodate the dimensions of the article 36 and, if the article 36 is a magnetic or optical memory storage medium, may be specified to protect the vulnerable storage area of the article 36 from damage. The pocket 34 has a transverse dimension or width that is slightly greater than one dimension of the article 36 and a depth defined by the false bottom 42 that is slightly less than an orthogonal dimension of the article 36. When the article 36 is fully received in pocket 34, the false bottom 42 may permit a portion of the article 36 to be visible when the mailer 10 is in an unfolded condition. However, the extent of the false bottom 42 is chosen to ensure that an upper edge 58a of transport belts 58 (FIGS. 5 and 6) and other pressure-exerting components of the postal processing equipment either does not contact any portion of the article 36 or does not contact over half of article 36, depending upon the requirements of the application. The false bottom 42 can be omitted in certain embodiments of the invention, depending upon the dimensions of the article 36, so that the article 36 abuts, or nearly abuts, the top edge 16.

Exemplary articles 36 include stress-sensitive articles formed of a material, such as plastic or a polymer, that is susceptible to damage and more specifically, frangible or breakable plastic articles such as storage media containing information. Common storage media include standard compact disks (CD's) or mini-compact disks (mini-CD's) with at least one information-bearing surface. The storage media may carry audio information and/or video information. A typical CD, which is formed of polycarbonate, has a diameter slightly less than 5 inches (about 12 cm) diameter and a hub extending from a diameter of about 1.5 cm (about 0.6") to about 4.6 cm (1.8"). A typical mini-CD, for example, has a maximum linear dimension of less than about 3.5 inches. The article 36 may also have a construction that is not susceptible to damage when handled by postal processing equipment but nonetheless should be lifted out of the beltpath when processed by postal processing equipment.

Figure 5:
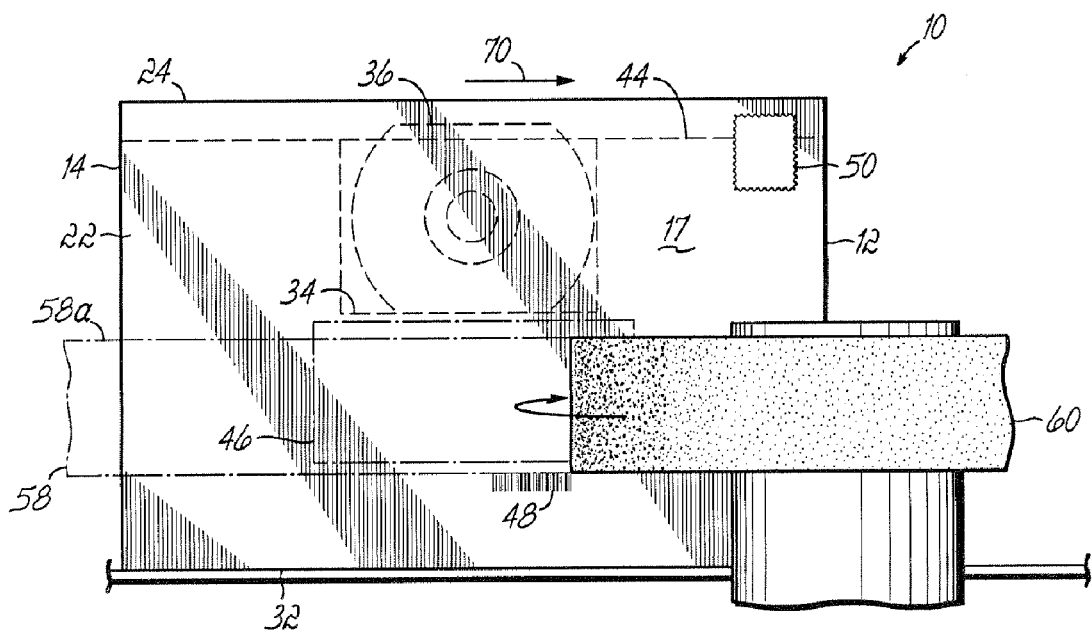
FIG. 5 is a schematic side view illustrating the mailer of the invention being handled by automated processing equipment at a location along the belt path.

Mailer 10 is constructed to substantially comply with United States Postal Service regulations governing automation-compatible mailpieces. To that end, the mailer 10 height should be between 6.125 inches and 3.5 inches and the mailer 10 length should be between 5 inches and 11.5 inches, wherein length is the dimension parallel to an address 46 when that address 46 is read and the height is the dimension perpendicular to the length. The ratio of length to height, or aspect ratio, should be between 1.3 and 2.5 and a thickness between 0.007 inch and 0.25 inch. Postal regulations require that the mailer 10 and its contents, article 36, an article 36a or another article, bend easily when transported about an 11-inch diameter cylindrical drum 60, as shown in FIGS. 5 and 6.

With reference to FIG. 2, the front side 17 of panel 22 includes an outbound or original address 46, an optional bar code 48, and postage 50. The original address 46 is printed such that address 46 is parallel to the longest folded dimension or length of mailer 10. Mailpieces, such as mailer 10, are usually oriented by postal processing equipment such that the original address 46 of each mailpiece 10 faces a consistent direction and has a consistent vertical orientation. Specifically, the longest dimension or length of the mailer 10 is aligned parallel to the direction of motion, indicated generally by arrow 70 (FIG. 5). The front side 17 of panel 28 may include a return address 52 or may be blank so that a recipient can provide a return address 52 on panel 28. The destination and return addresses 46, 52 are both located on the front side 17 of the mailer 10.

Figure 4A:
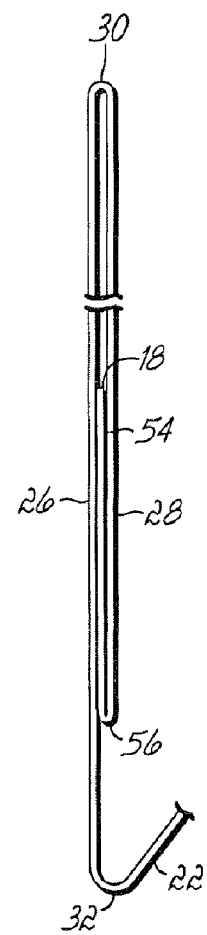
FIG. 4A is a cross-sectional view taken generally along line 4A-4A in FIG. 4.
Figure 4:
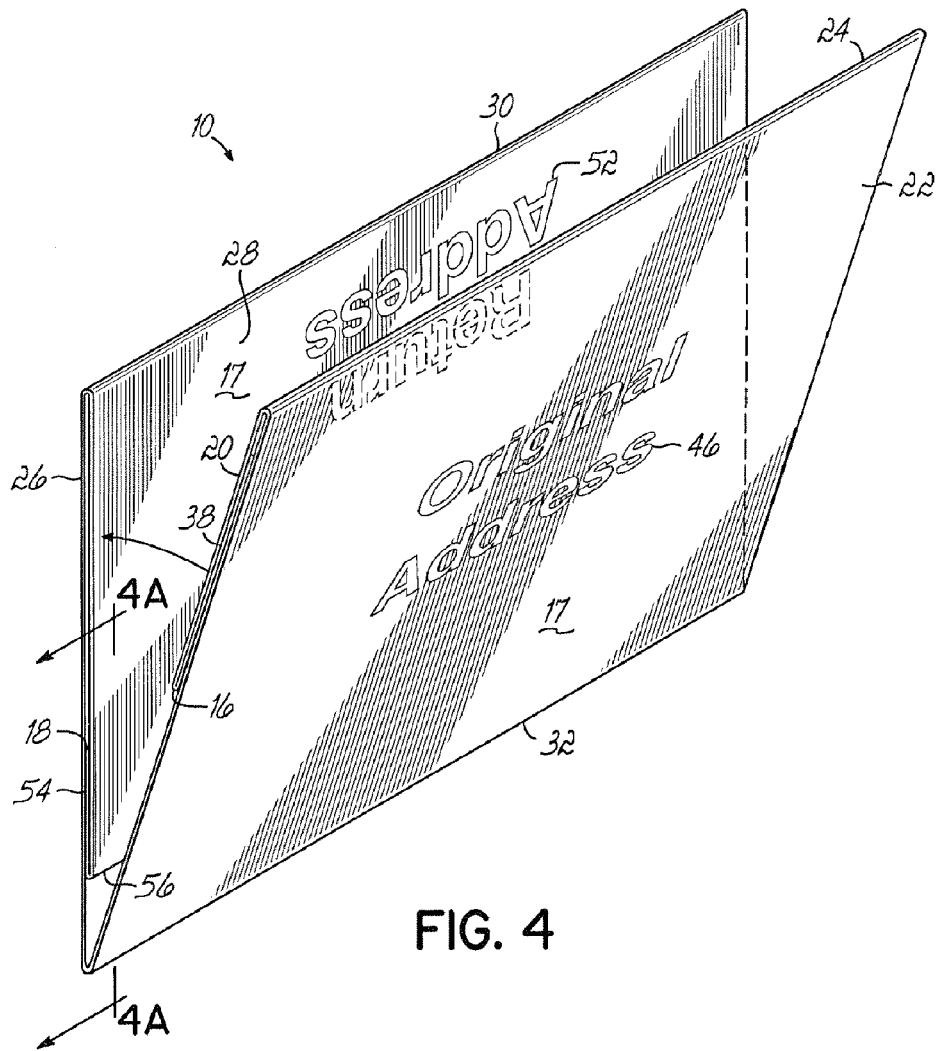
FIG. 4 is a perspective view similar to FIG. 3 illustrating the folding for outgoing dispatch from a sender to a recipient.

With reference to FIGS. 1 and 2, mailer 10 further includes a resizing extension or flap 54 joined along a transverse fold line 56 with the fourth panel 28. The resizing flap 54 is located at an opposite longitudinal end of the mailer 10 from the pocket 34 that receives the article 36. The resizing flap 54 is stowed away inside the mailer 10 in its folded state for dispatch from a source (i.e., sender) at the original address 46 to an intended addressee or recipient. An amount of a low-tack adhesive 57 may be applied to the resizing flap 54 to adhesively secure flap 54 to fourth panel 28 in the stowed position (FIGS. 4 and 4A). In an alternative embodiment, flap 54 may be replaced by a tab-shaped flap 54a (FIG. 1) that has a dimension measured parallel to fold line 56 less than a corresponding dimension of panel 28. The resizing flap 54 may be deployed from the stowed position to a deployed position (FIG. 7) by compromising low-tack adhesive 57, if present, and unfolding along fold line 56 to extend outwardly from the mailer 10, when folded so that return address 52 on panel 28 is visible.

The height of the fourth panel 28, measured between fold lines 30 and 56 may be shorter in height (i.e., the dimension in a direction between the top and bottom ends 16 and 18) than the second and third panels 22, 26. However, the summed height of the fourth panel 28 and the resizing flap 54 is greater than the height of either the first panel 20 or the second panel 22. The resizing flap 54, when deployed, operates to increase the effective height of mailer 10 to provide a non-letter or flat mailpiece. In certain embodiments, the resizing flap 54, when deployed, increases the height of the mailer 10 to exceed 6⅛ inches, which is a current regulatory threshold for classifying mailpieces as letter-sized. However, the invention contemplates that the threshold height is related to prospective regulatory guidance and subject to change. Therefore, in accordance with the invention, the incremental increase in height (i.e., shorter dimension of mailer 10) provided by the resizing flap 54 is a height increase adequate to change the height of the mailer 10 from a height that is letter automation-compatible, when flap 54 is stowed, to a height characterizing flat dimensions under postal regulations, when flap 54 is deployed.

The resizing flap 54 may be constructed to be maintained in the deployed position during processing by the postal service. To that end, the location of the transverse fold line 56 should be configured to provide the requisite stiffness. More specifically, the location of fold line 56 relative to fold line 30 may be selected such that fold line 56 is not proximate to the transverse fold line 32 of the mailer 10 when folded with the resizing flap 54 deployed, although the invention is not so limited. When the fold lines 30, 56 are arranged in this manner, the underlying panel 22 adds support and stiffness to the resizing flap 54. In one specific embodiment, fold line 56 is located one inch from the underlying transverse fold line 32, when the resizing flap 54 is unfolded and the mailer 10 is folded, in a direction toward a transverse fold line 30. In another embodiment, fold line 56 may be approximate aligned with, and overlie, the transverse fold line 32 when the resizing flap 54 deployed.

When the resizing flap 54 is deployed, mailer 10 cannot be handled by letter-sized processing equipment as described herein. Instead, the mailer 10 with the deployed resizing flap 54 is handled by flat processing equipment.

In use and with reference to FIGS. 1-8, the mailer 10 is folded in a non-accordion style (i.e., surfaces of the panels on opposite sides 15, 17 of mailer 10 contact in the folded state, which differs from accordion style folding in which each pair of contacting surfaces is on the same side of the folded item) for mailing to original address 46. With specific reference to FIGS. 3, 3A, 4 and 4A, the article 36 is positioned through the opening 44 (FIG. 1) into pocket 34. The first and second panels 20 and 22 are folded at the fold line 24 such that the article 36 and fifth panel 38 are sandwiched between the first and second panels 20 and 22. The resizing flap 54 is folded along fold line 56 over the fourth panel 28 and the fourth panel 28 is subsequently folded along fold line 30 over the third panel 26 so that flap 54 is captured between the third and fourth panels 26, 28 in the folded state. First and second panels 20 and 22 are then folded along fold line 32 so that the exposed portions of panels 20 and 22 contact the exposed portions of panels 26 and 28 to establish a folded or closed state.

The resizing flap 54 is located in a captured position interposed between the third and fourth panels 26 and 28. In the folded state, the article 36 is sandwiched between the first and second panels 20 and 22 and the article 36 is inaccessible from the exterior of the mailer 10. A sealing member (not shown), such as an adhesive or a tape, is used to secure the mailer 10 in the folded state. When the mailer 10 is in a folded state, the article 36 is inaccessible from the exterior of the mailer 10, protected from damage, and secured from becoming dislodged.

The sender addresses the mailer 10 with at least the original address 46 and optional bar code 48 by any conventional technique, such as labeling, typing or printing. Other information (not shown), such as a Facing Identification Mark (FIM), an indication of the mailer's class, and sender's address, may be provided on the same surface of mailer 10 as the original address 46, optional bar code 48, and postage 50. Typically, a group of mailers 10 is readied for bulk mailing and supplied to the postal service faced and oriented. The mailer 10, in its folded state and sealed, is routed as a letter from the sender to the recipient at the original address 46 via the postal service.

FIGS. 5 and 6 schematically illustrate the processing of mailer 10 as an outbound mailpiece by conventional automated processing equipment comprising moving belts, such as transport belts 58, and rotating drums, such as cylindrical drum 60. The cylindrical drum 60 is used to change the direction of motion of the transport belts 58 and, thereby, to redirect the travel path of mailpieces, such as mailer 10, gripped between the transport belts 58. In such conventional automated processing equipment, transport belt 58 has a width of about 2 inches and the cylindrical drum 60 has a diameter of about 11 inches and a width of about 3 inches. Typically, a pair of transport belts 58 grasp a 2-inch wide height of the opposed parallel faces of each mailpiece, such as mailer 10, and transport the mailer 10 along a travel path for a purpose such as sorting. The transport belts 58 are wound about and driven by the cylindrical drums 60 such that the mailer 10 must traverse a curved path about the circumference of cylindrical drum 60 in that portion of the travel path.

The mailer 10 is oriented vertically according to the location of original address 46 and provided to the transport belts 58 for transport with fold line 32 located between or proximate to belts 58. Fold lines 24 and 30 are furthest from the belts 58. The article 36 or, at the least, the center of the article 36, inside pocket 34 is positioned above the upper edge 58a of the transport belts 58 so that neither of the transport belts 58 can contact the portion of mailer 10 directly overlying more than half of the article 36.

Mailer 10 is bent about the exterior of cylindrical drum 60 to change the direction of the travel path of mailpieces, such as for stacking the mailer 10, along with other mailpieces, in a bin or receiver 72. In the vicinity of the cylindrical drum 60, the mailer 10 is constrained between transport belt 58 and a curved guide rail 74 and subsequently follows a curved path about the outer circumference of the cylindrical drum 60.

Mailer 10 maintains its integrity during transportation and arrives at the recipient with the article 36 intact and undamaged as the article 36 or at least the center of the article 36 is lifted out of contact with transfer belts 58. Because the flexing of the region of the mailer 10 near the pocket 34 is significantly reduced, the risk of damaging or breaking the article 36 is significantly reduced when the mailer 10 moves in a curved path about the outer circumference of the cylindrical drum 60. At the destination, the recipient opens the mailer 10 by compromising the sealing member and unfolding the panels 20, 22, 26 and 28 to the unfolded or open state (FIGS. 1 and 2).

After unfolding, printed indicia 45 carried by the rear side 15 will be visible to the recipient and the article 36 will be accessible for removal by the recipient. Other types of indicia 45, such as foil stamping, die-cut shapes and embossing, may be provided on the rear side 15 or the front side 17 of mailer 10 in addition to printing.

Figure 7:
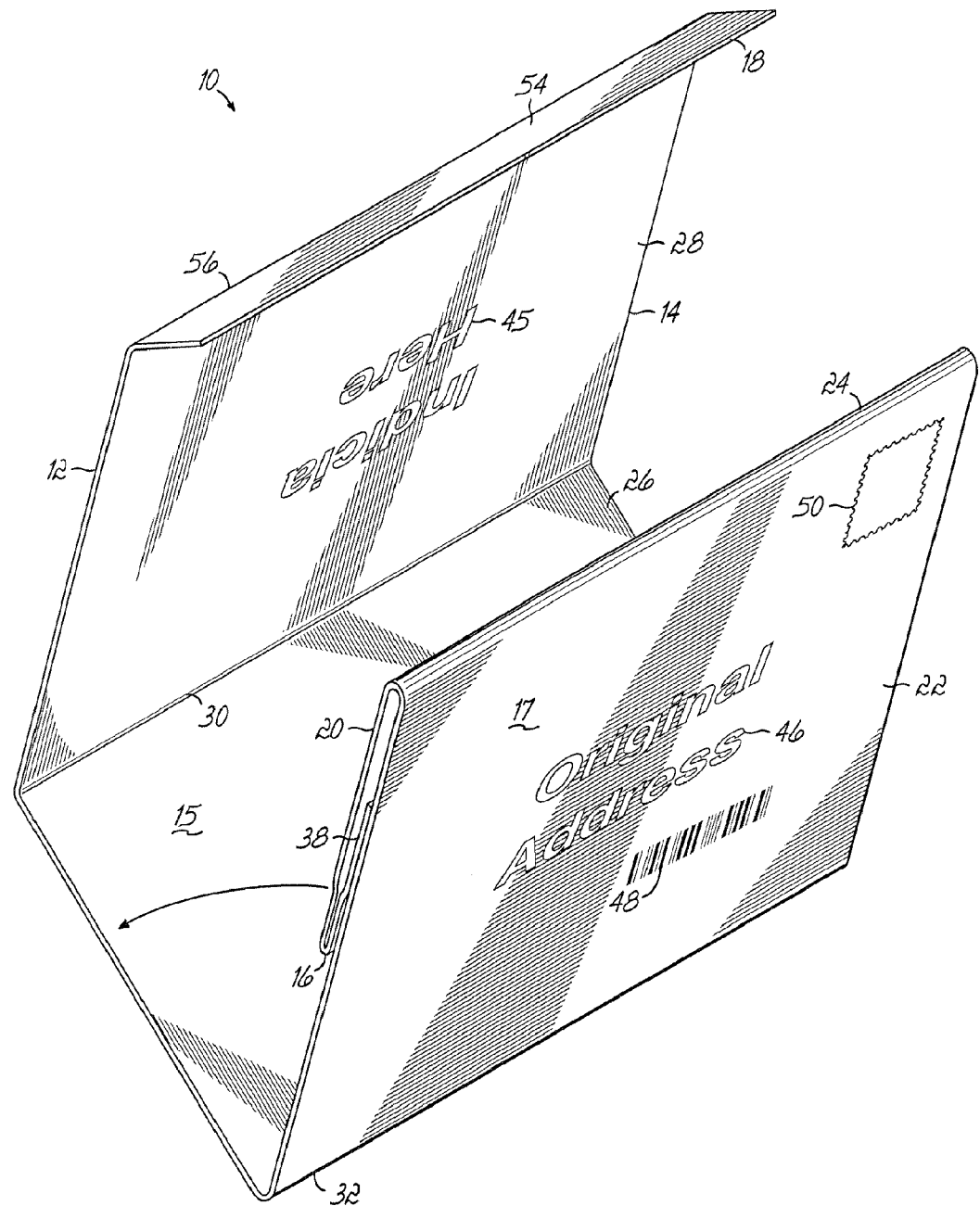
FIG. 7 is a perspective view of the mailer of FIG. 1 shown at a stage of folding for deploying the resizing flap and arranging the mailer panels so that the return address is visible and the original address is hidden.

With reference to FIG. 7, the recipient may insert the article 36 into pocket 34, refold the mailer 10 so that the return address 52 is visible from the exterior of the mailer 10, secure the mailer 10 in the folded condition, and mail the article 36 to a third party, such as the original sender. To that end, the first and second panels 20 and 22 are folded at the fold line 24 such that the article 36 and panel 38 are sandwiched between the first and second panels 20 and 22. The resizing flap 54 is deployed by unfolding along transverse fold line 56 so that resizing flap 54 extends or projects outwardly from panel 28. The first and second panels 20 and 22 are folded to overlie the third panel 26 and then the fourth panel 28 and the extended resizing flap 54 are folded inwardly to cover the original address 46 and thereby, establish the folded or closed state. The mailer 10 is sealed by a selectively-activated adhesive (not shown), such as a moisture-activated adhesive or tape. In the folded state, the return address 52 is visible.

Figure 8:
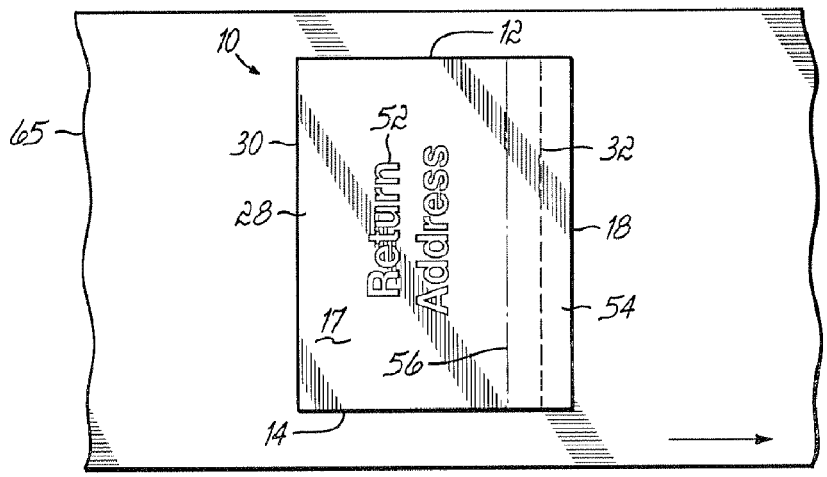
FIG. 8 is a view of the mailer of FIG. 1 being handled by postal equipment designed for non-letter sized mailpieces after the resizing flap is deployed for return mailing.

As illustrated in FIG. 8, the presence of the deployed resizing flap 54 alters (i.e., increases) the height of the mailer 10 so that mailer 10 is no longer within the range of dimensions characterizing a letter and, therefore, is rejected by the facer canceller. The mailer 10, in a closed state and sealed, is routed from the recipient to the postal location indicated by the return address 52 via the postal service. Because of the increased size of the mailer 10, the mailer 10 is rejected by the facer canceller and instead handled as a flat mailpiece. As a result, the mailer 10 is sorted without bending about drums and rollers and is handled as a flat transferred for sorting on a conveyor 65. This increases the probability that the article 36 will arrive intact at the location of the return address 52.

Among the potential applications, the mailer 10 may be used, for example, as a two-way or return mailer for article 36, such as would be useful for return mailing CD's or DVD's back to the original source. The invention contemplates that the mailer 10 may incorporate multiple pockets 34 (FIG. 1) for carrying or transporting multiple stress-sensitive articles 36. Mailer 10 is typically presorted along with multiple other mailers 10 for outbound mailing with the address 46 readable and faced. Because the mailers 10 are presented to the postal service in a presorted group, an automated processing machine, called the facer canceller, is bypassed during outbound mail processing. In orienting mailer 10, the facer canceller processes the mailers 10 both upside down and right side up. When mailer 10 is processed upside down, article 36 is within the beltpath so susceptible to contact by the belts 58. For non-sorted mailpieces, the facer canceller faces (i.e., orients) mailpieces through detection of postage 50 on the mailer 10 so that the address 52 is readable and may cancel the postage 50 with a postmark that shows the post office name and canceling date.

In transit for return from the recipient to the sender (or another third party), the mailer 10 is typically deposited in a public mail collection site. The mailer 10 and many other commingled mailpieces also deposited at the collection site are randomly oriented as a collection of mixed postal items. The resizing flap 54 increases the dimensions of the mailer 10 so that the mailer 10 is too large to fit into the feeding mechanism of the facer canceller. As a result, the mailer 10 is not compatible with letter sorting equipment and is culled from the collection of mixed postal items manually or by, for example, the facer canceller itself. The mailer 10 is then handled as a flat mailpiece per postal regulations during the return mailing so that the mailer 10 is not exposed to the belts 58 and drums 60 of automated equipment used to handle letters.

Figure 9:
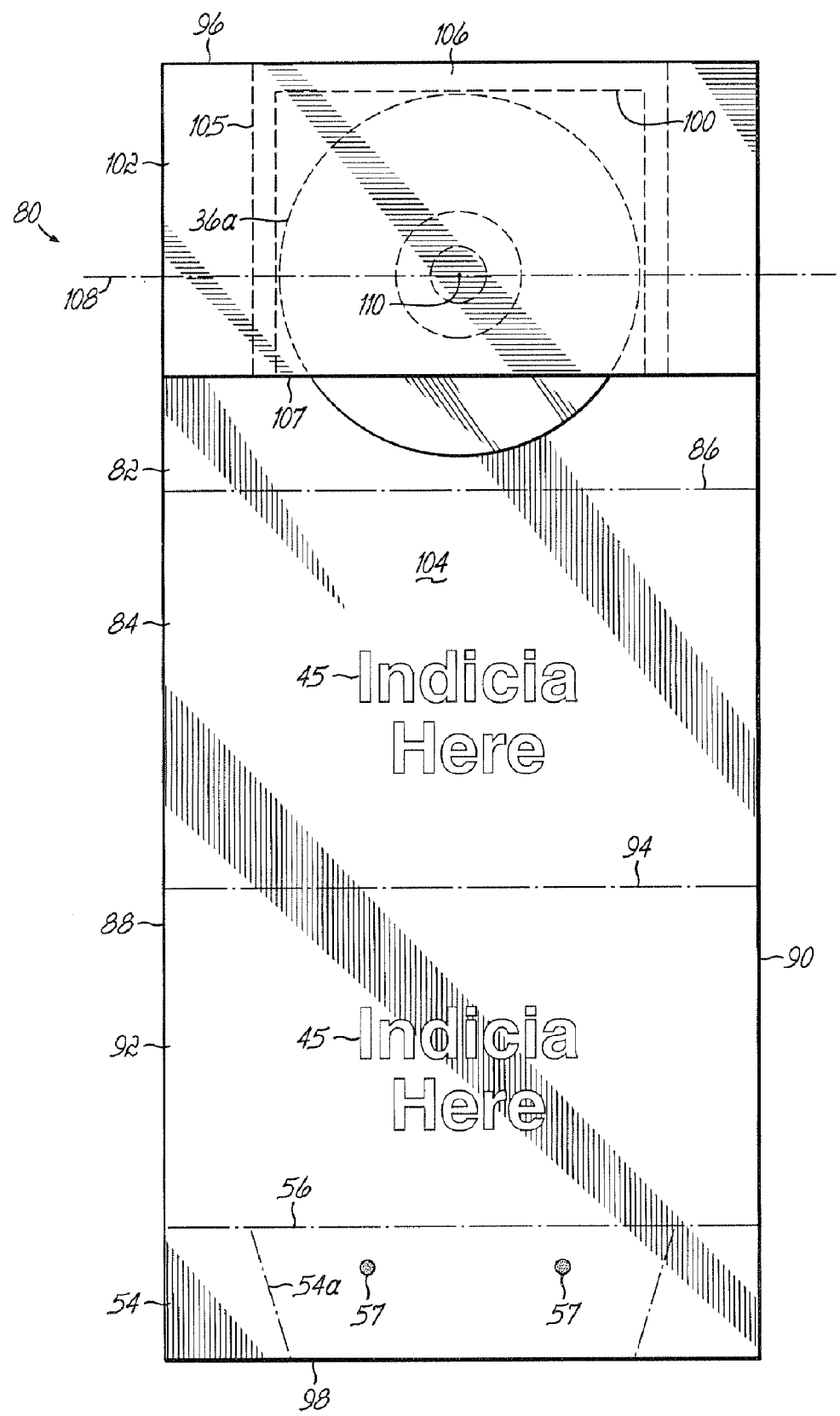
FIG. 9 is a rear view of an embodiment of a mailer in accordance with the invention in an unfolded state.
Figure 10:
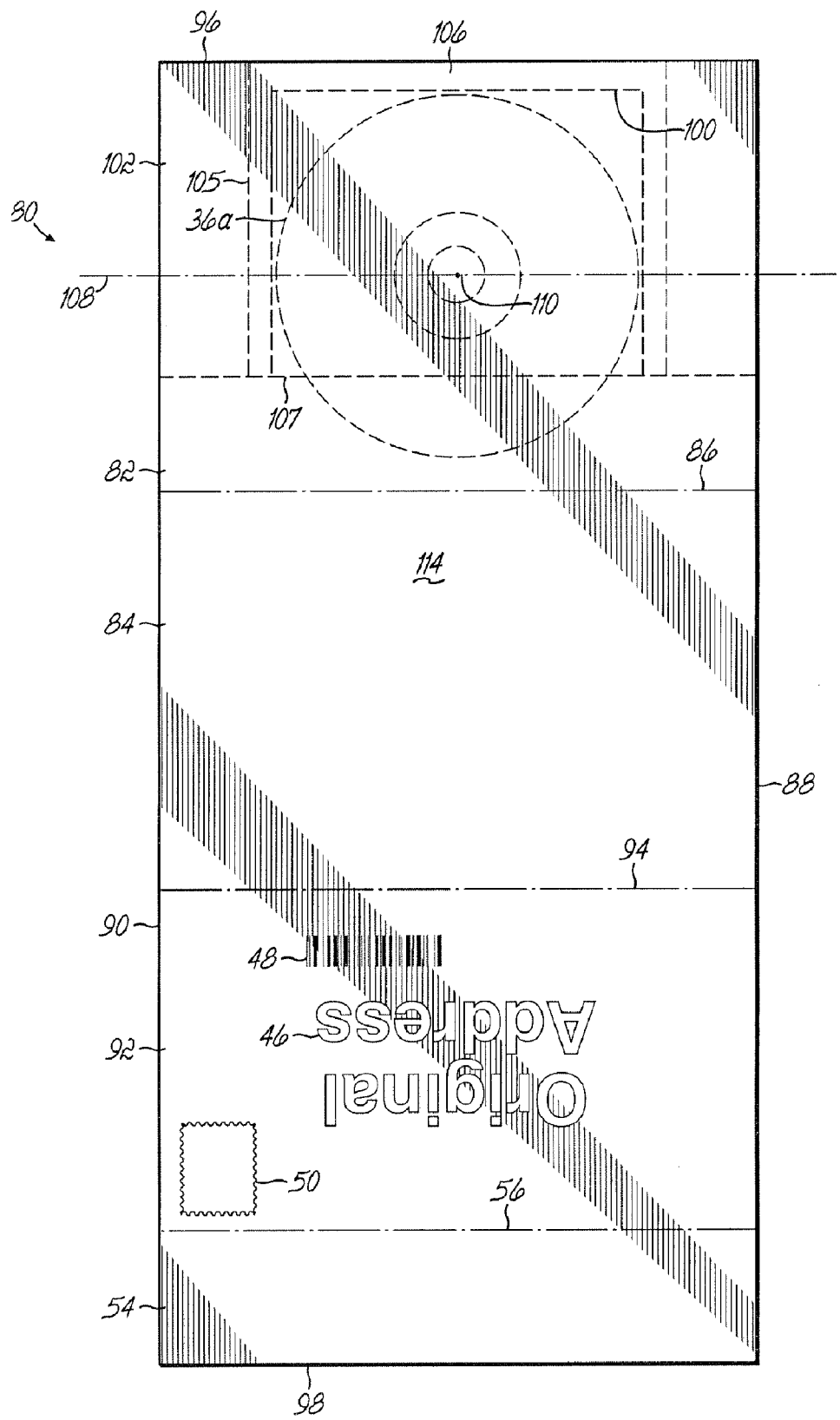
FIG. 10 is a front view of the mailer of FIG. 9.

With reference to FIGS. 9 and 10 in which like reference numerals refer to like features in FIGS. 1-8 and in accordance with an alternative embodiment of the invention, a mailer 80 includes a first panel 82, a second panel 84 integrally joined along a transverse fold line 86 extending between side edges 88 and 90 with the first panel 82, and a third panel 92 integrally joined along a transverse fold line 94 extending between side edges 88 and 90 with the second panel 84. Although the invention is not so limited, mailer 80 includes resizing flap 54, which may be optionally omitted. The fold lines 86 and 94 are substantially parallel to or transverse to the longest or major dimension of mailer 80 and have a spaced relationship to divide the mailer 80 into panels 82, 84 and 92. Panel 82 may be shorter, as measured between a top edge 96 and fold line 86, in a direction extending between the top edge 96 and a bottom edge 98 than panels 84 and 92, as measured between adjacent fold lines.

Mailer 80 includes a pouch or pocket 100, similar to pocket 34 (FIG. 1), defined near the top edge 96 that is configured to hold and protect article 36a, which is similar or identical to article 36. The pocket 100 is defined as a space between the first panel 82 and a fourth panel 102 adhesively bonded to a rear side 104. Specifically, confronting surface areas of the first and fourth panels 82 and 102 are joined by adhesive 105, which defines lateral boundaries for pocket 100 and an edge boundary connecting the lateral boundaries proximate and substantially parallel to the top edge 96. The distance between the top edge 96 and the edge boundary defines a false bottom, generally indicated by reference numeral 106, for pocket 100. The pocket 100 includes an access opening 107 opposite to the false bottom 106 that is oriented to face substantially toward the fold line 86 and that is dimensioned between the lateral boundaries of pocket 100 to receive the article 36a therethrough for positioning within pocket 100. The adhesive may have different configurations, such as adhesive dots, adhesive strips, or a layer of coadhesive applied as a pattern to the panels 82 and 102. The first and fourth panels 82 and 102 may be integral along the top edge 96 and joined along a fold line (not shown), or the fourth panel 102 may be a separate piece from the first panel 82. When the mailer 80 is in a folded condition or state, the pocket 100 and the article 36a are inaccessible from the exterior of the mailer 80 without unsealing and unfolding the mailer 80.

The dimensions of the pocket 100 are predetermined to accommodate the dimensions of the article 36a. Accordingly, the pocket 100 has a transverse dimension or width that is slightly greater than one dimension of the article 36a and a depth defined by the false bottom 106 that is slightly less than an orthogonal dimension of the article 36a. When the article 36a is fully received in pocket 100, the false bottom 106 may permit a portion of the article 36a to be visible when the mailer 80 is in an unfolded condition. However, the positioning of the article 36a in pocket 100, including the width of the false bottom 106, is chosen to ensure that the transport belts 58 (FIGS. 5 and 6) and other pressure-exerting components of the postal processing equipment do not contact the half of the article 36a above an imaginary line 108 that is substantially parallel to fold line 86 and that intersects a center 110 of article 36a regardless of rotational orientation. In other words, imaginary line 108 is positioned either above or collinear with the upper edge 58a of the transport belts 58. As a result, the pocket 100 is positioned such that only half of article 36a is located between the transport belts 58 during processing. The false bottom 106 can be omitted in certain embodiments of the invention, depending upon the dimensions of the article 36a, so that the article 36a abuts, or nearly abuts, the top edge 96. The mailer 80 includes original address 46, optional bar code 48 and postage 50 on a front side 114 and may also optionally include printed indicia 45 on rear side 104.

With reference to FIG. 11, the mailer 80 is folded in a non-accordion style for mailing to original address 46 by a procedure similar to the procedure illustrated for mailer 10 (FIG. 1). The article 36a is positioned through the opening 107 into pocket 100. The first and second panels 82 and 84 are folded at the fold line 86 such that the article 36a and fourth panel 102 are sandwiched between the first and second panels 82 and 84. The resizing flap 54, if present, is folded along fold line 56 over the third panel 92 and the third panel 92 is subsequently folded along fold line 94 over the first panel 82 so that flap 54 is captured between the first and third panels 82 and 92 to establish a folded or closed state. In the folded state, the original address 46, bar code 48 and postage 50 are visible. When oriented by postal processing equipment, the mailer 80 is consistently oriented according to the original address 46 such that the fold lines 56 and 86 are oriented upward and is positioned above the transport belts 58 (FIG. 5) when captured therebetween. In the folded state, the mailer 80 is used as described above in the context of mailer 10 (FIGS. 1-8).

Figure 12:
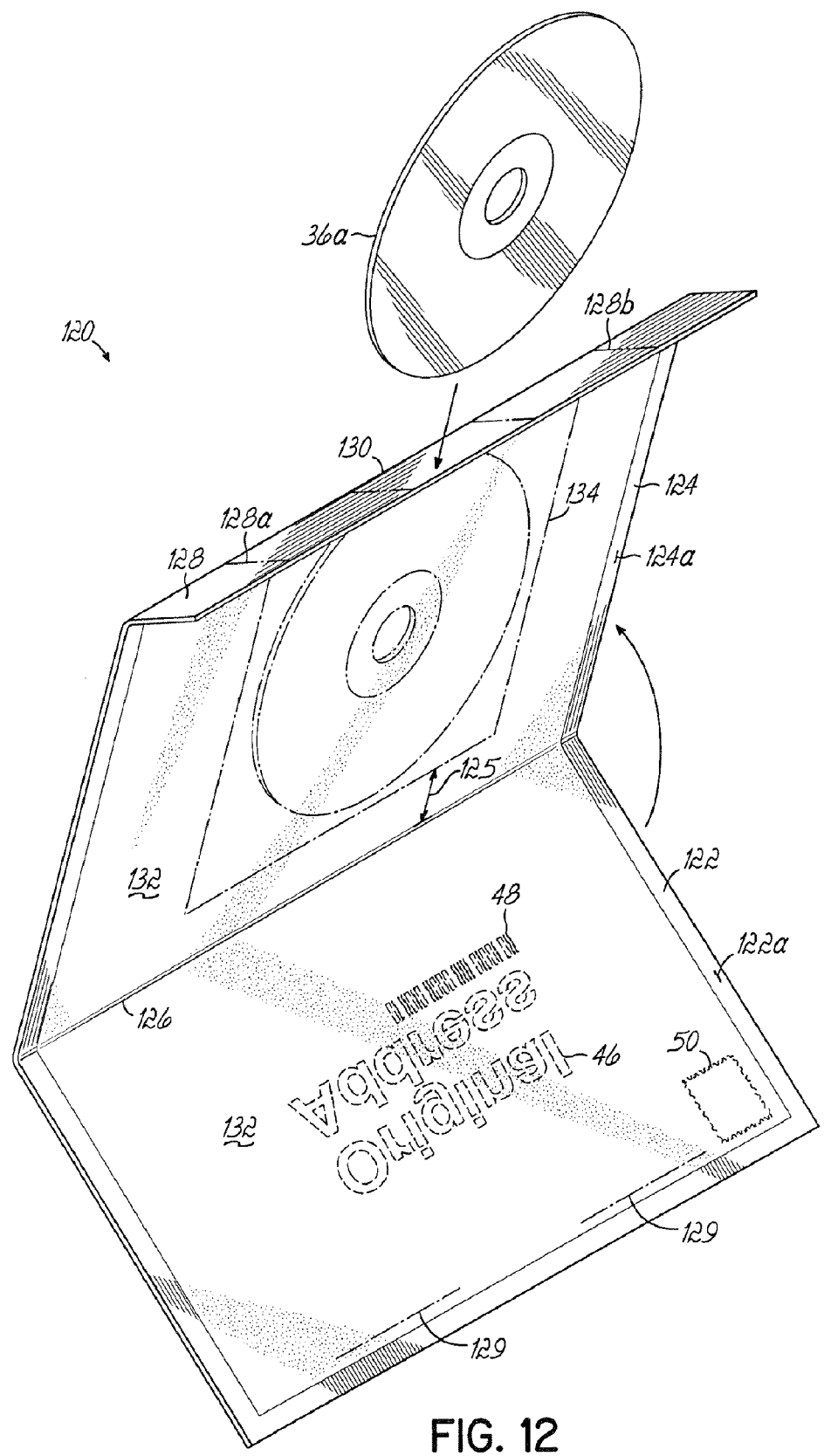
FIG. 12 is a perspective view of a mailer in accordance with an alternative embodiment of the invention.

With reference to FIG. 12 and in accordance with an alternative embodiment of the invention, a mailer 120 is provided that includes a pair of panels 122 and 124 hingeably or foldably joined along a transverse fold line 126 and a smaller optional panel or flap 128 hingeably or foldably joined along a transverse edge or fold line 130 to panel 124. In an alternative embodiment, the flap 128 may be omitted so that two discrete panels 122, 124 collectively form mailer 120. Adhesive 132 is applied across an inner surface 122a, 124a of panels 122 and 124, respectively, so that the mailer 120 is folded to provide a C-fold configuration, or panels 122, 124 are otherwise joined, with the confronting inner surfaces 122a, 124a in a contacting relationship. The adhesive 132 establishes an adhesive bond between the inner surfaces 122a, 124a that secures the panels 122 and 124 together to prevent unfolding or separation during postal processing and defines the dimensions of a pocket 134 to surround article 36a. Adhesive 132 may be any coadhesive that provides an adhesive bond with itself and, hence, does not adhesively bond with the article 36a when it is pre-positioned between the panels 122 and 124 before folding or joining. After folding or joining, the panels 122 and 124 are on opposite sides of article 36a in a protective spatial relationship, as described above with regard to mailer 10 (FIG. 1) and mailer 80 (FIG. 8). Persons of ordinary skill in the art will appreciate that article 36 (FIG. 1) and other types of stress-sensitive articles (not shown) may be held by the mailer 120, as well as mailers 10 and 80.

A front surface of panels 122, 124, visible when the panels 122, 124 are secured by adhesive 132, bears original address 46, optional bar code 48, postage 50, etc. Flap 128 operates as a sealing flap for mailer 120 and may be provided with adhesive or tape to provide the seal. Alternatively, flap 128 may be omitted if the article 36a is fully concealed between panels 122, 124 or flap 128 may be divided into one or more laterally-spaced tabs 128a, 128b that are received in appropriately positioned optional slits or tab slots 129 defined in panel 122. In one embodiment, the mailer 120 is letter-sized with a height of about 6 inches.

Figure 12A:
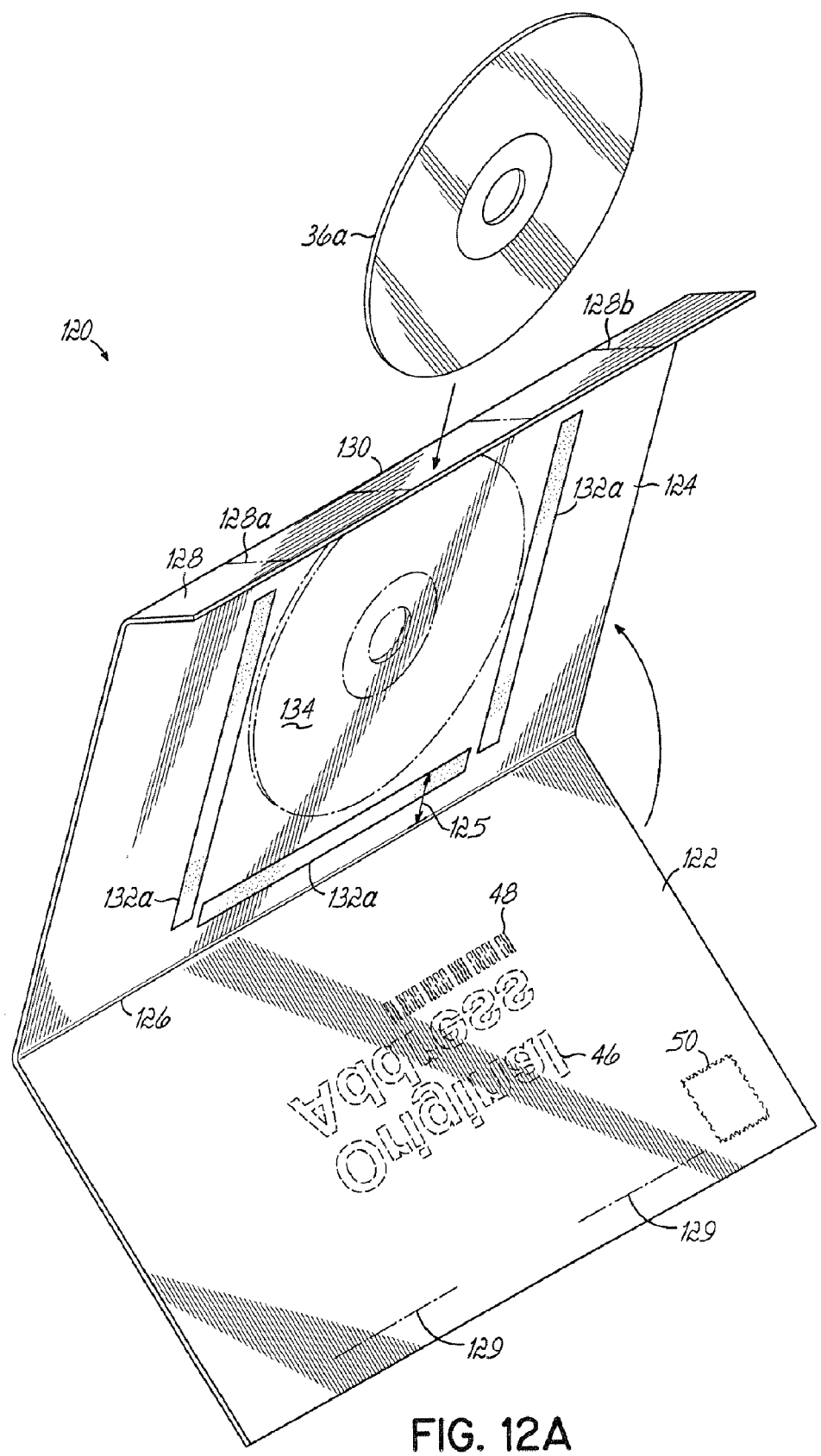
FIG. 12A is a perspective view of an alternative embodiment of the mailer of FIG. 12.

In an alternative embodiment, the adhesive 132 may be applied to the inner surfaces 122a, 124a of panels 122, 124, respectively, in a pattern to define pocket 134. This approach may be applicable if transfer of adhesive 132 to the article 36a is a concern. After pre-positioning the article 36a between the panels 122 and 124 and folding, panels 122 and 124 are still on opposite sides of article 36a in a protective spatial relationship, as described above with regard to mailer 10 (FIG. 1) and mailer 80 (FIG. 8). In yet another alternative embodiment available in conjunction with the definition of pocket 134, article 36a may be inserted into a throat or open end of the pocket 134 defined between the lateral boundaries established by the pattern of adhesive 132 after the panels 122, 124 are folded or joined. Panels 122 and 124 are on opposite sides of article 36a in a protective spatial relationship, as described above with regard to mailer 10 (FIG. 1) and mailer 80 (FIG. 8). As shown in FIG. 12A, pocket 134 may be defined by applying discrete amounts of adhesive, such as strips or blocks of adhesive 132a, to one of the panels 122, 124, for example, panel 124 and folding or otherwise joining panels 122, 124.

With continued reference to FIG. 12, article 36a is positioned relative to the panels 122, 124 such that, when the panels 122, 124 are folded for mailing and oriented for processing with transverse fold line 126 downwardly oriented, at least half of the article 36a will be located or lifted above the upper edge 58a of the transport belts 58 (FIGS. 5 and 6) to insure safe processing of article 36a, as described above with regard to mailers 10 (FIG. 1) and 80 (FIG. 8). In other words, imaginary line 108 (FIG. 10) of article 36a is positioned above the upper edge 58a of transport belts 58. This lift is provided by adjusting the article location and/or the position of pocket 134 to define a false bottom 125 that separates article 36a from fold line 126.

The invention contemplates that adhesive 132, although described as a coadhesive, may have any suitable configuration and arrangement for securing article 36a between panels 122 and 124. For example, the adhesive 132 may be suitably-arranged adhesive dots or stripes, as shown in FIG. 12A. The pocket 134 is configured to lift at least half of the article 36a out of the beltpath of high-speed automated processing equipment. It is appreciated that one or more parallel lines or beads of adhesive 132 may be applied in conjunction with one or more spaced dots of adhesive 132 to mailer 120 for purposes of defining the pocket 134.

Although the pocket 134 is depicted as approximately centered along the length of mailer 120 and equidistant from the side edges of the panels 122, 124, the invention contemplates that the pocket 134 may be located at other transverse positions by adjusting the configuration and arrangement of the pattern of adhesive 132. Panels 122, 124 may have equal lengths and heights or may differ in either relative length or relative height. However, the dimensional difference should not relocate the pocket 134 to a position susceptible to damage from high-speed automated processing equipment during transport.

In use and with continued reference to FIG. 12, after the article 36a is positioned relative to the panels 122 and 124 at a location that provides the requisite separation from fold line 126, panel 124 is folded along fold line 126 into registration with panel 122 or otherwise joined with panel 122 so that adhesive 132 establishes an adhesive bond when pressure is applied. Alternatively, article 36a may be inserted into the optional pocket 134 after the panels 122, 124 are joined by adhesive 132. If adhesive 132 is applied in a pattern, the regions on the panels 122, 124 that lack adhesive 132 will be located in registration with one another and surround the article 36a. Flap 128, if present, is folded over panel 122 and sealed. The article 36a held inside mailer 120 is inaccessible from the exterior of the mailer 120, protected from damage, and secured from becoming dislodged against movement inside the mailer 120. In a procedure similar to that described for mailer 10 (FIG. 1), mailer 120, in a closed state and sealed, is routed outbound from the sender to the destination address 46 via the postal service, which typically utilizes automated processing equipment for sorting the mailer 120 according to the destination address 46. The recipient opens the mailer 120 by compromising the adhesive 132 and/or the optional seal provided by flap 128 to gain access to the article 36a.

In certain embodiments, the fold line 130 may be perforated or scored so that flap 128 is removable from mailer 120. The recipient may use the mailer 120 as a protective storage sleeve after receipt. The invention also contemplates that the flap 128 may be used as a resizing flap, as described herein for resizing flap 54 (FIGS. 1, 9). The mailer 120 may be used to return article 36a to the original sender by, for example, covering the address 46 with a return address label, reinserting article 36a into pocket 134, optionally deploying flap 128 as a resizing flap or using flap 128 to seal the mailer 120, and mailing mailer 120. If the flap 128 is deployed as a resizing flap, the mailer 120 should be handled as a flat mailpiece by the postal service.

With reference to FIG. 12A in which like reference numerals refer to like features in FIG. 12 and in accordance with an alternative embodiment of the invention, pocket 134 of the mailer 120 may be defined by discrete amounts of adhesive 132a applied in a pattern that defines three boundaries of the pocket 134. Although illustrated as adhesive strips or blocks, the invention contemplates that adhesive 132 may have the form of adhesive dots or beads. When the panels 122, 124 are folded along fold line 126 and into contact, an adhesive bond is established by adhesive 132a. Article 36a may then be inserted into pocket 134 and flap 128, if present, used to seal the mailer 120.

Figure 12B:
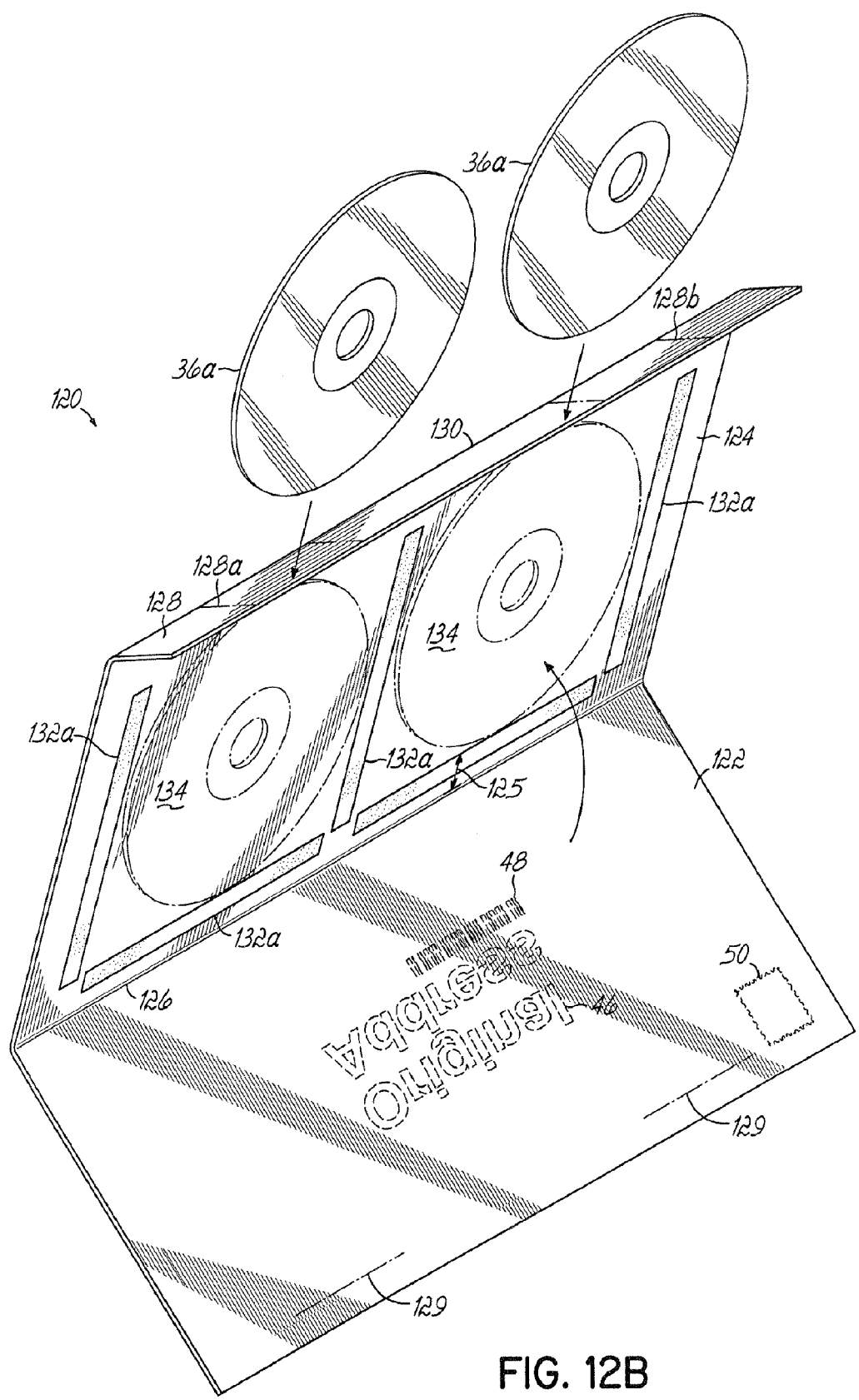
FIG. 12B is a perspective view of an alternative embodiment of the mailer of FIG. 12.

With reference to FIG. 12B in which like reference numerals refer to like features in FIG. 12 and in accordance with an alternative embodiment of the invention, the mailer 120 may be provided with two pockets 134a, 134b that are positioned side-by-side between panels 122, 124. Each of the pockets 134a, 134b is dimensioned to receive an article 36a, although the invention is not so limited. The dimensions (height and width) of the mailer 120 is adjusted to accommodate the presence of two pockets 134a, 134b, each of which is separated from fold line 126 by false bottom 125 dimensioned to lift the held articles 36a out of the beltpath of postal processing equipment. Depending upon the size and geometry of the article 36a, it is apparent to persons of ordinary skill that more than two pockets may be defined between the panels 122, 124. The invention contemplates that any embodiment of the mailers and sleeves described herein may be provided with two or more pockets, similar to pockets 134a, 134b provided for the version of mailer 120 shown in FIG. 12B, and that each of these multiple pockets is arranged to lift the held article 36a out of the beltpath of postal processing equipment.

Figure 13:
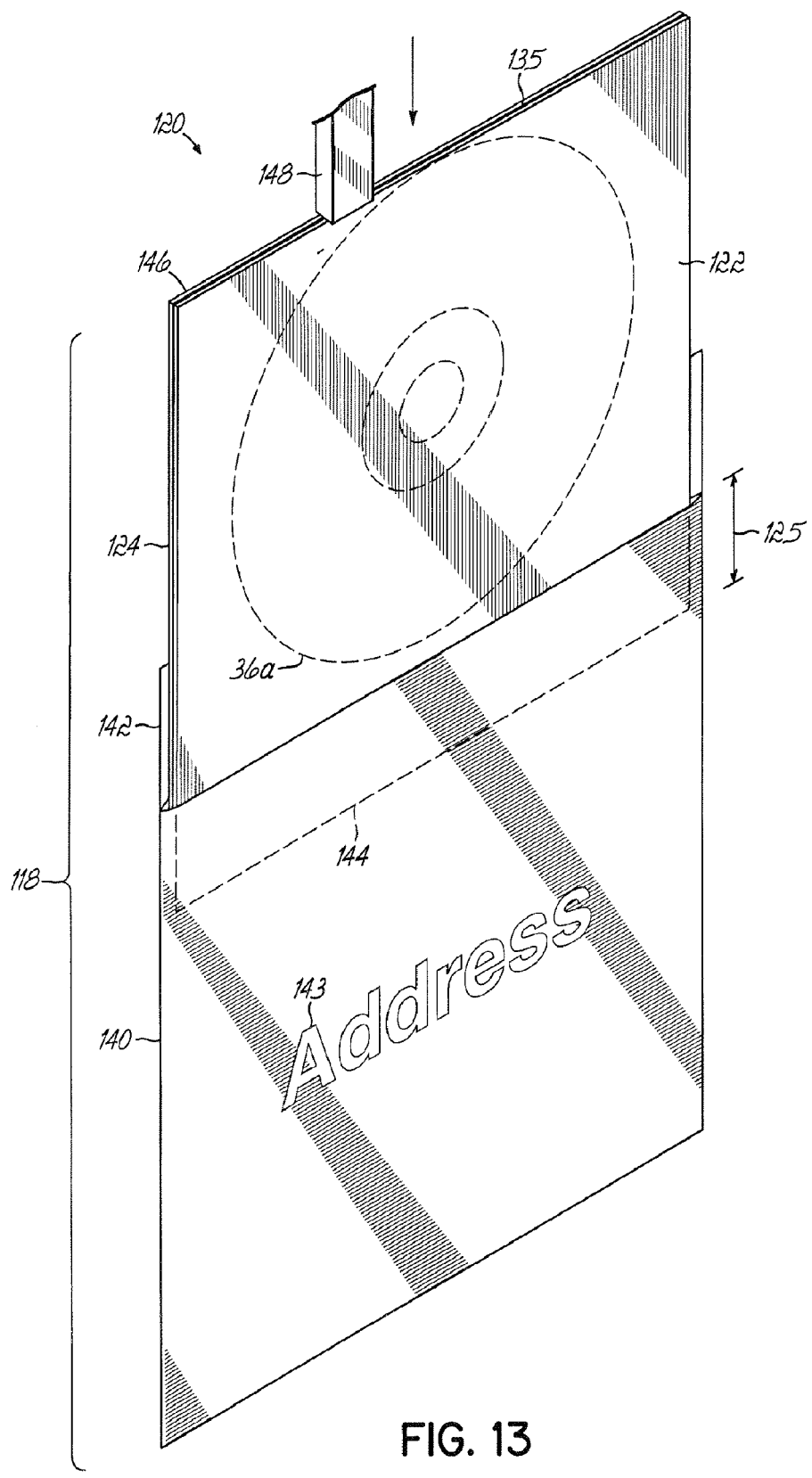
FIG. 13 is a perspective view showing an embodiment of the mailer of FIG. 12 without a closing flap being inserted into a separate envelope for mailing.

With reference to FIG. 13 in which like reference numerals refer to like features in FIG. 12 and in accordance with an alternative embodiment of the invention, the embodiment of the mailer 120 lacking flap 128 may be treated as an insert that is inserted into an envelope 140, which bears an outbound address 143, and mailed outbound inside the envelope 140. The article 36a is positioned relative to a first edge 144 of mailer 120, which is defined along fold line 126, so that a second edge 146 of mailer 120, which is opposite to first edge 144 and includes an access opening 135 to the pocket 134, can be inserted into the envelope 140. The invention contemplates that the access opening 135 may be, for example, along a side edge so long as the false bottom 125 is remote from the flap 142 of the envelope 140. A pusher arm 148 transfers the mailer 120 into envelope 140, which is then sealed and mailed. The envelope 140 has an enclosed space dimensioned to fully receive the mailer 120. The envelope 140 includes a sealable flap 142 that is sealed to the body of the envelope 140 after mailer 120 is inserted.

The distance from edge 144 to the nearest portion of article 36a is selected by adjusting the location of the adhesive 132 so that the contacting panels 122, 124 of mailer 120 may be clamped or gripped during the insertion process, if necessary for processing mailer 120, by a gripper arm (not shown) across the false bottom 125 of the mailer 120 defined between bottom edge 144 and the nearest boundary of pocket 134 without contacting the article 36a. This false bottom 125 between bottom edge 144 and the nearest portion of article 36a provides an area for gripping the mailer 120 without damaging the article 36a. Panel 122 or panel 124 may have a shorter height measured between the bottom and top edges 144, 146, respectively, so that a portion of the article 36a is uncovered by the shorter panel and, therefore, exposed and visible.

The location of the address 143 on the envelope 140, the dimensions of the mailer 120 and envelope 140, and the height of the false bottom 125 are chosen such that the article 36a will not be damaged by processing with automated processing equipment, as described herein. Imaginary line 108 (FIG. 9) is positioned either above or collinear with the upper edge 58a of the transport belts 58. As a result, the pocket 100 is positioned such that less than half of article 36a is located between the transport belts 58 (FIGS. 5 and 6) during processing. In various specific embodiments, the mailer 120 and any of the other mailers described below, when treated as an insert, may be sized to fit inside a standard 6"×9" envelope, a standard 6"×9.5" envelope, a 6"×11.5" envelope, or any other sized envelope. The mailer 120 defines a protective sleeve that maintains the article 36a anchored per postal regulations and that may be inserted into envelope 140 of any size using existing insertion technology. Additional inserts (not shown), such as collateral marketing materials, may be positioned inside envelope 140 and mailed along with mailer 120. The recipient may retain the mailer 120 after receipt and continue to use the mailer 120 as a protective storage sleeve for the article 36a.

Figure 14A:
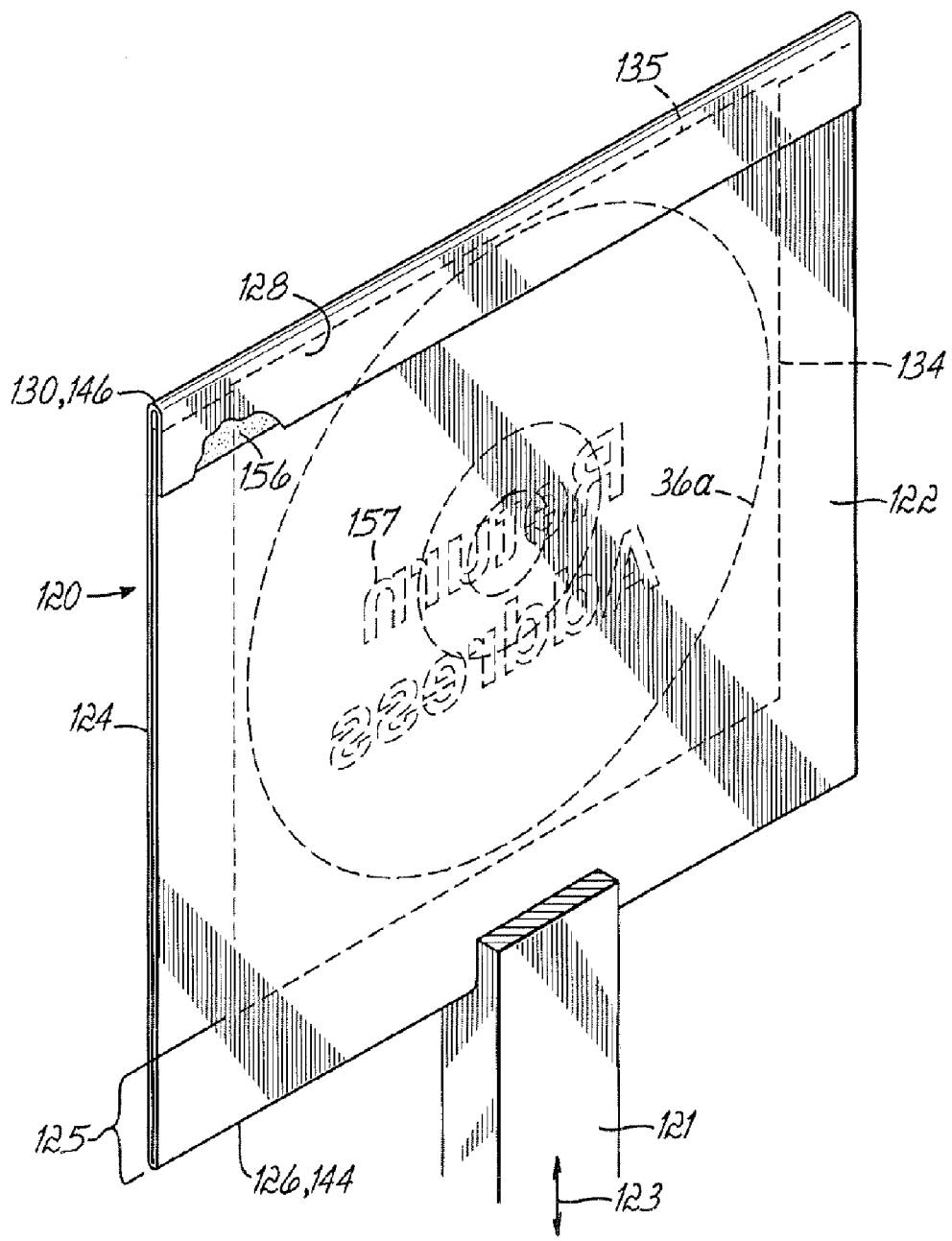
FIGS. 14A and 14B are perspective views of a mailer for an article and an envelope in accordance with an alternative embodiment of the invention.

With reference to FIGS. 14A,B in which like reference numerals refer to like features in FIG. 13 and in accordance with an alternative embodiment of the invention, the embodiment of the mailer 120 (FIG. 12) bearing flap 128 may also be treated as an insert. When so treated, the mailer 120 is inserted into an envelope 150 for outbound mailing as a mailing member or assembly 118 for transporting article 36a.

As shown in FIG. 14A, the article 36a is inserted through the access opening 135, which is defined near the fold line 130, into the pocket 134 of mailer 120. The pocket 134 and article 36a are thus positioned between edges 144, 146. Various types of conventional inserters, such as swing arm inserters, friction inserters, and plow folders, may be used to position article 36a inside pocket 134. Flap 128 is folded over panel 122 to provide a C-folded arrangement. The invention contemplates that the access opening 135 may be, for example, along a side edge so long as the false bottom 125 is remote from the flap 154 of the envelope 150 and located beneath the original address 152.

A gripper arm 121, which is movable generally in at least a direction 123, includes a clamping arrangement that clamps or grips opposite sides of the mailer 120 at a location near edge 144 and along the extent of false bottom 125. Mailer 120 may be removed from a hopper containing multiple mailers 120, each containing one of the articles 36a. The false bottom 125 defines a gripping zone or area across which the gripper arm 121 can grip the mailer 120 without damaging the article 36a. The gripper arm 121 re-positions the assembly of the mailer 120 and article 36a for insertion into the envelope 150 (FIG. 14B).

Figure 14B:
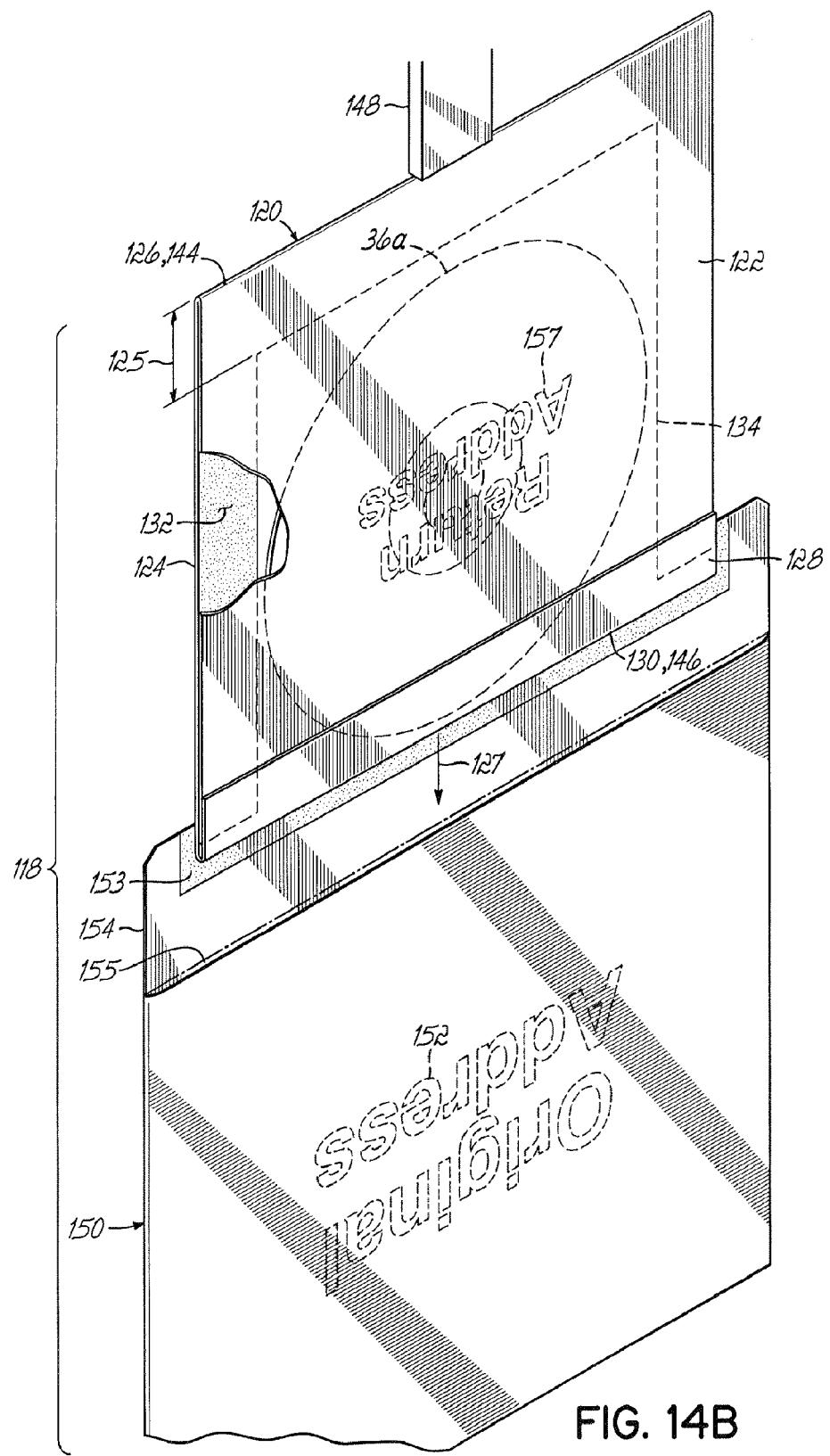

As shown in FIG. 14B, the assembly of the article 36a and mailer 120 is inserted flap-first into envelope 150. During insertion, the pusher arm 148 contacts and pushes the mailer 120 into envelope 150 in a direction generally indicated by reference numeral 127. Edge 146, which coincides with fold line 130 between panel 124 and flap 128, of mailer 120 is inserted first into the envelope 150. After insertion, the false bottom 125 near mailer edge 144 is located adjacent to the envelope flap 154 and located generally between a fold line 155 joining envelope flap 154 with a body of envelope 150 and original address 152.

The envelope 150 bears an outbound or original address 152 that is inverted relative to fold line 155 for envelope flap 154. After insertion and as a consequence of the orientation of the original address 152 relative to the fold line 155, the false bottom 125 of mailer 120 is located between the original address 152 and the fold line 155. In other words, the false bottom 125 is located below the original address 152. Because the original address 152 is inverted, the envelope 150 is grasped during processing by letter-size postal equipment along an envelope edge including envelope flap 154 such that the false bottom 125 resides in the grasped region. Preferably, less than half of article 36a is located between the transport belts 58 (FIGS. 5,6) and contacted by transport belts 58 during processing. As a result, article 36a has a significantly reduced likelihood of being damaged when processed by automated letter-sized processing equipment.

The invention contemplates that, for any of the various embodiments of the present invention described herein that utilize an envelope such as the assembly 118 of mailer 120 and envelope 150, the envelope may have an access opening for inserting of the mailer and optional sleeve that is positioned along any edge of the envelope. For example, envelope 150 may have an access opening along a side edge through which the article 36a is inserted into pocket 134. Regardless of the specific envelope construction, the mailer and optional sleeve are inserted into the envelope such that the false bottom is beneath the original address, such as original address 152 on envelope 150, which lifts the article 36a from the portion of the envelope contacted by letter-size postal processing equipment. The mailer and optional sleeve may be inserted flap-first, flap-last, edgewise, etc. without limitation if the mailing address and the false bottom bear the proper arrangement and relationship. In addition, the invention contemplates that the original address in any of the various embodiments of the present invention described herein may be oriented with any orientation relative to the access opening so long as the orientation of the original address results in the lift-producing false bottom being located beneath the original address. In other words, the arrangement of the false bottom and the original address either on the envelope or visible through a window in the envelope orients the envelope during processing, rather than the location of the envelope access opening.

The envelope 150 is sealed by closing the flap 154 and using sealing strip 153 to secure the mailer 120 inside and the assembly consisting of mailer 120 and envelope 150 is deposited with the postal service for delivery to a recipient at the original address 152. The assembly of mailer 120 and envelope 150 is forwarded by the postal service to a recipient at the original address 152. The recipient compromises the sealing strip 153 of envelope 150 to open the envelope 150 and extracts the mailer 120 from the opened envelope 150 for accessing the article 36a. The used envelope 150 may be discarded after the mailer 120 is extracted.

The recipient may retain the mailer 120 after receipt and continue to use the mailer 120 as a protective storage sleeve for the article 36a. In this embodiment of the present invention, mailer 120 further includes a return address 157, instead of the original address 46 (FIG. 12), such that the mailer 120 can be used by recipient to forward a sealed assembly consisting of the mailer 120 and article 36a to another addressee, such as the original sender or a third party addressee, at the return address 157. To that end, the article 36a is inserted into pocket 134 and flap 128 is moved to close the opening 135 to the pocket 134 and sealed.

Figure 14C:
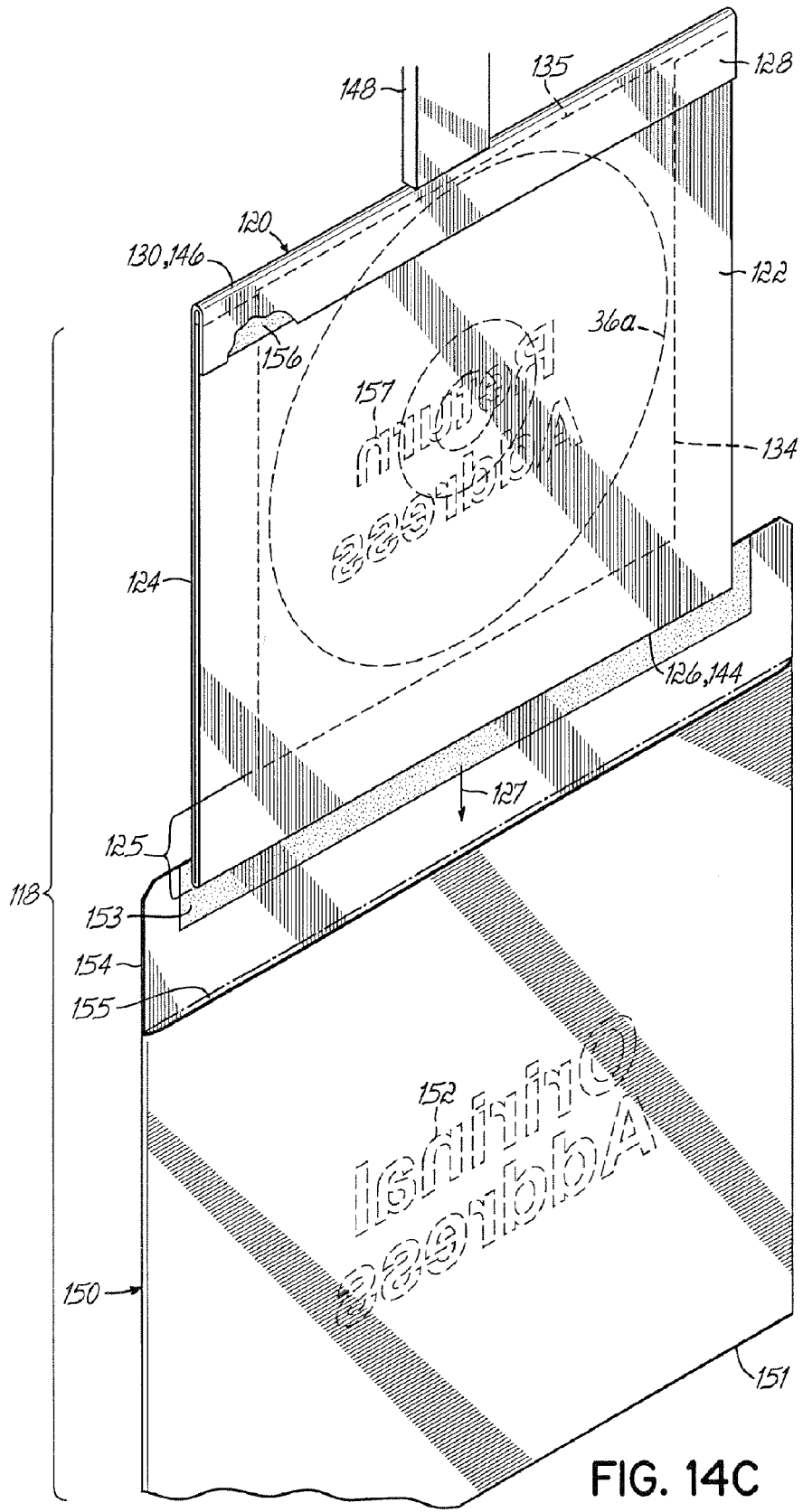
FIG. 14C is a perspective view similar to FIG. 14B in accordance with an alternative embodiment of the invention.

With reference to FIG. 14C in which like reference numerals refer to like features in FIGS. 14A,B and in accordance with an alternative embodiment of the invention, the mailer 120 may further include an amount of a substance 156, such as fugitive glue, that is distributed across the flap 128 at locations suitable to hold the flap 128 in proximate to the panel 122. The flap 128 is C-folded relative to panel 122 to close the opening 135 to pocket 134 and the assembly of mailer 120 and article 36a is inserted flap-last into envelope 150 by pusher arm 148. In other words, edge 144 of mailer 120, which coincides with fold line 126 for panels 122, 124, is inserted first into the envelope 150. The outbound address 152 on envelope 150 is oriented such that the false bottom 125 is between fold line 155 of envelope 150 and the original address 152 and, consequently, the false bottom 125 is located beneath outbound address 152.

The envelope 150 is grasped during processing by letter-size postal equipment along an envelope edge 151 including envelope flap 154 such that the false bottom 125 resides in the contacted region. Preferably, less than half of article 36a is located between the transport belts 58 (FIGS. 5,6) and thus contacted during processing. As a result, article 36a has a significantly reduced likelihood of being damaged when processed by automated letter-sized processing equipment. The assembly of mailer 120 and envelope 150 is forwarded by the postal service to a recipient at the original address 152. The recipient compromises the sealing strip 153 of envelope 150 and extracts the mailer 120 for accessing the article 36a. The envelope 150 may be discarded after the mailer 120 and article 36a are extracted therefrom.

Figure 15A:
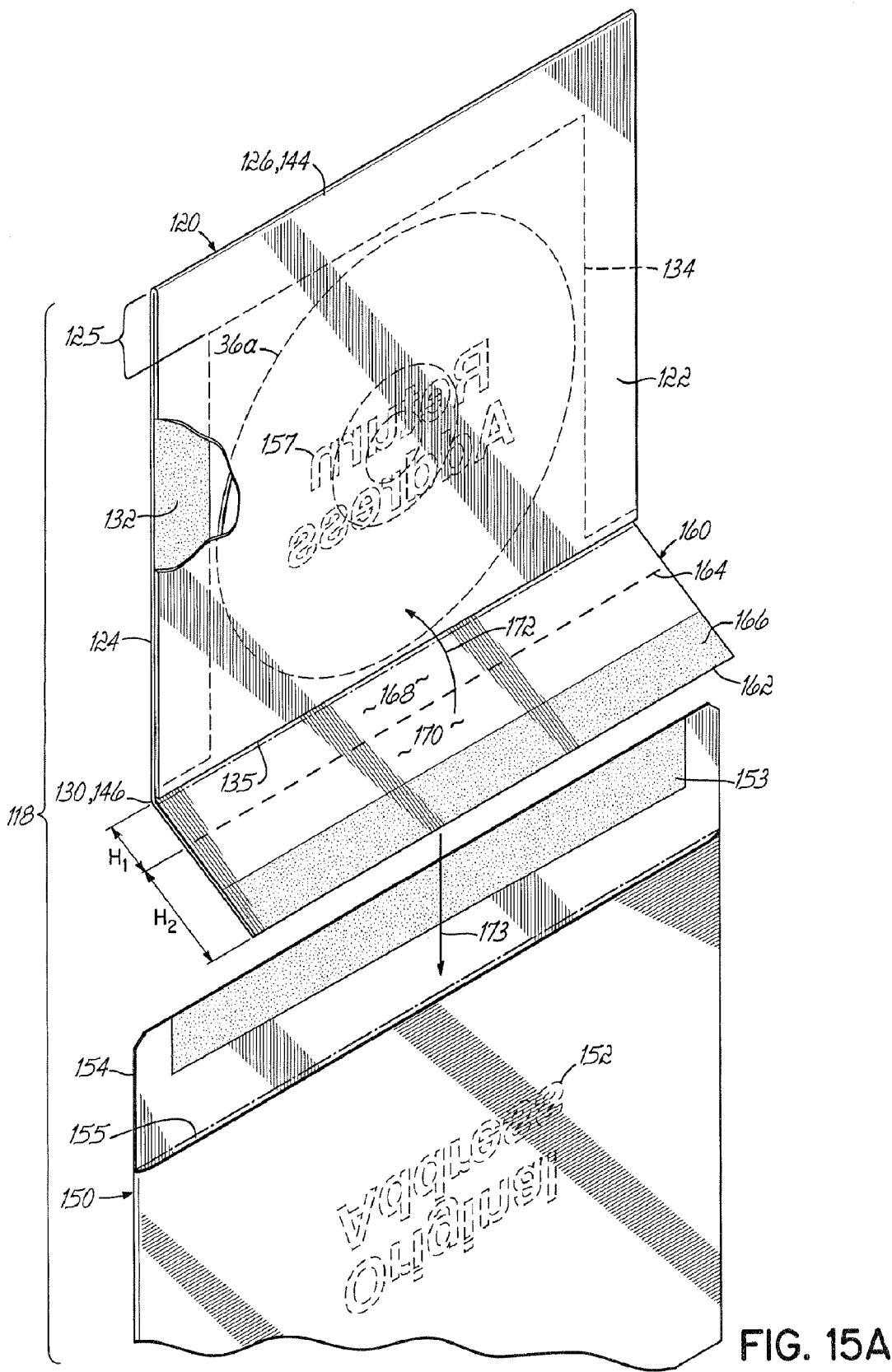
FIGS. 15A and 15B are front and rear perspective views of a mailer for an article and an envelope in accordance with an alternative embodiment of the invention.
Figure 15B:
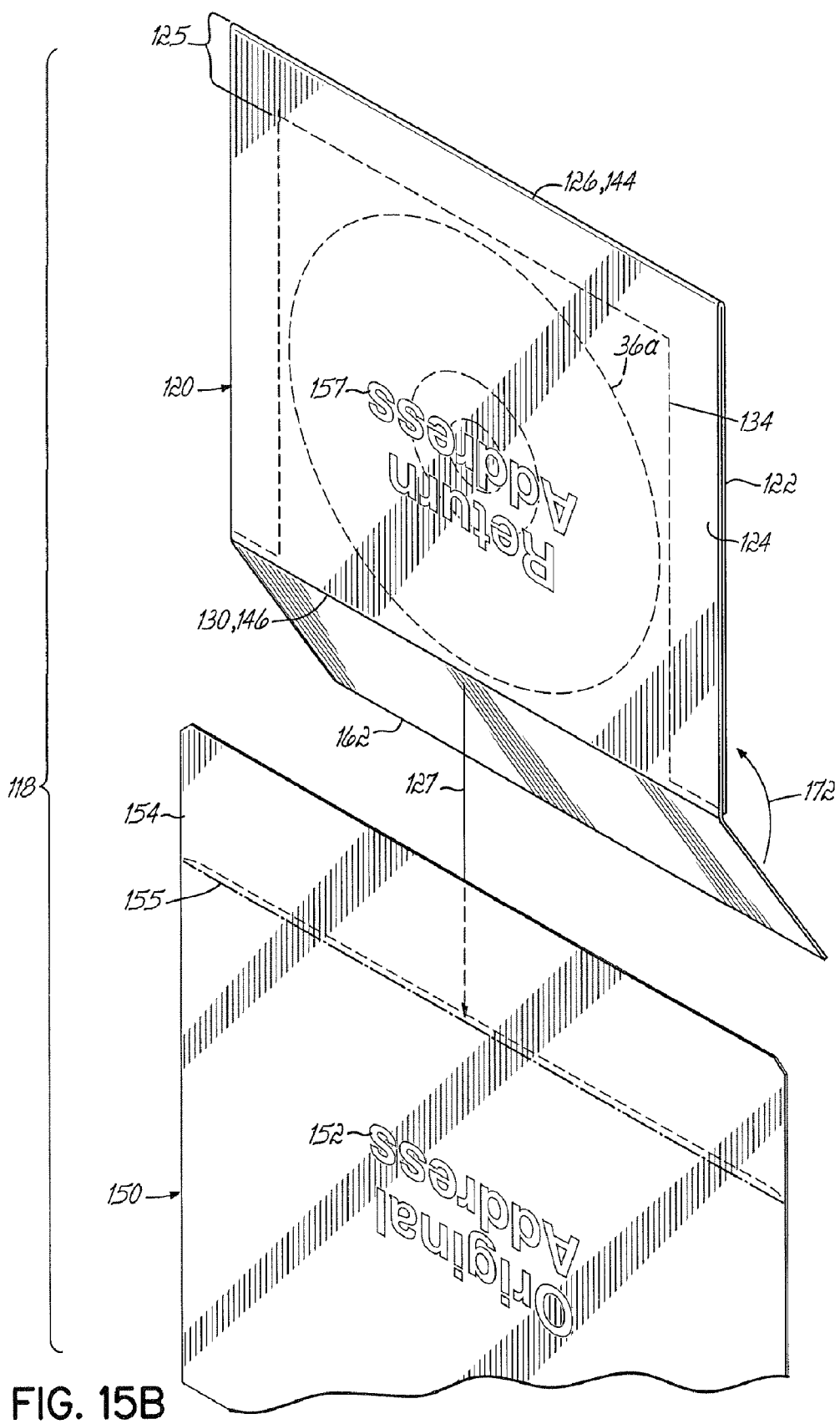
Figure 15C:
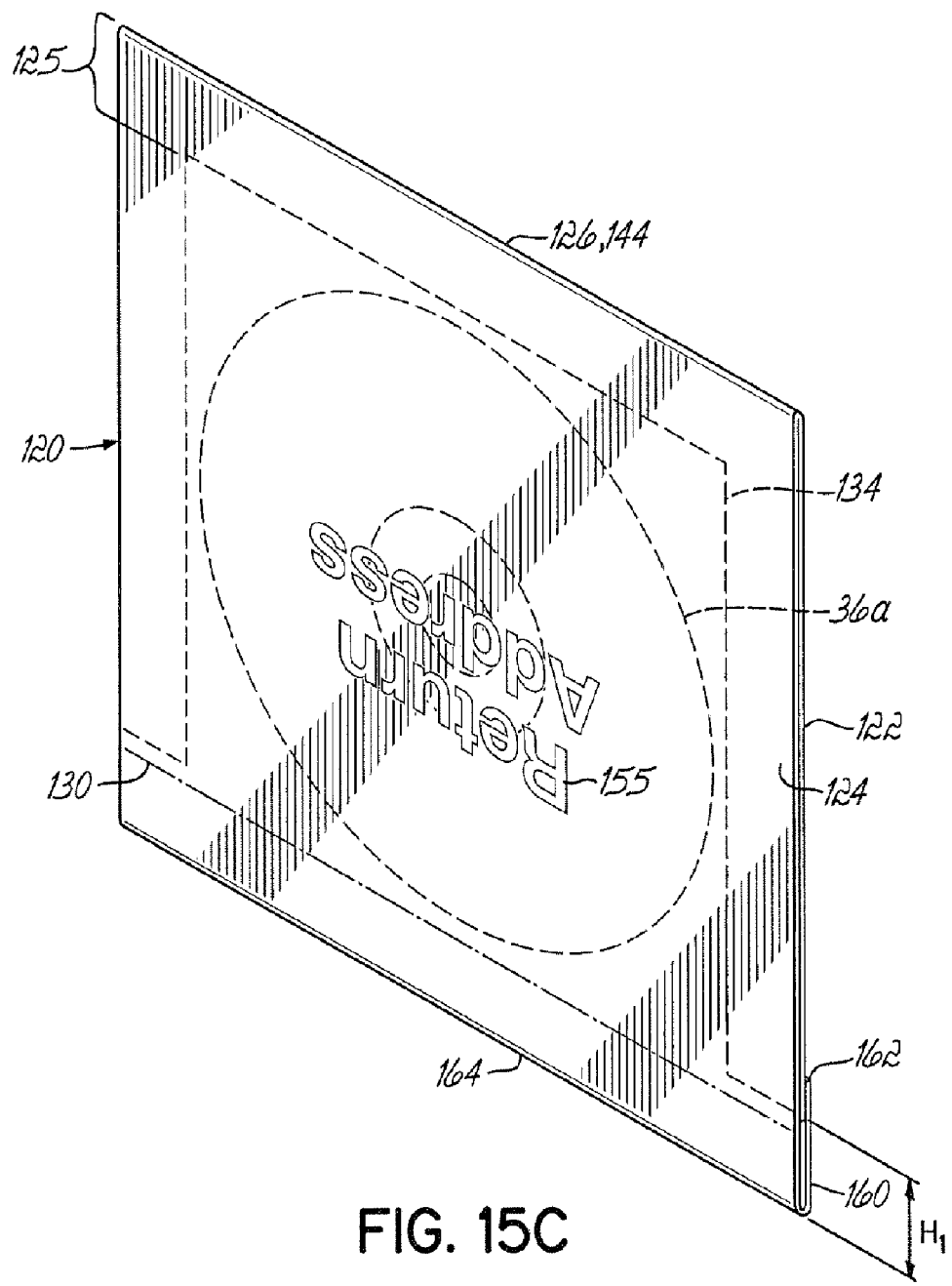
FIG. 15C is a perspective view of the mailer of FIGS. 15A,B configured for mailing to a recipient at a return address.

With reference to FIGS. 15A-C in which like reference numerals refer to like features in FIGS. 14A,B and in accordance with an alternative embodiment of the invention, mailer 120 may further include a flap 160 that is enlarged with an extended length in comparison with flap 128 (FIGS. 14A, B). Flap 160, which is trapezoidal shaped, is hingeably or foldably joined along the transverse edge or fold line 130 to panel 124 and extends to another transverse edge 162. In a folded configuration, the panels 122, 124 extend between the edge 144 located at fold line 126 to the edge 146 located at fold line 130. The invention contemplates that the flap 160 may be a separate component joined to panel 124 along edge 144 as an attached appendage by, for example, adhesive bonding, as opposed to the hinged joint configuration provided by fold line 126.

A line of weakening or latent fold line, such as a score line 164 defined by a line of discontinuous cuts or slits, and an adhesive region 166 are positioned between fold line 130 and edge 162. The score line 164 separates the flap 160 into section 168 bounded by fold line 130 and section 170 that carries the adhesive region 166. The incremental height, $H_1$, of section 168 is shorter than the incremental height, $H_2$, of section 170 such that, when folded along score line 164 to form the arrangement shown in FIG. 15C, at least a portion of the adhesive region 166 contacts panel 122. Section 170 is larger in surface area than section 168. The adhesive region 166 may be of a peel and seal type strip having a removable protective barrier covering pressure-sensitive adhesive or may be a formulation that is moisture or pressure activated.

As shown in FIGS. 15A,B, article 36a is inserted into opening 135 of pocket 134 and flap 160 is folded over panel 122 in direction 172 (i.e., C-folded). The assembly of the mailer 120 and the article 36a is inserted flap-first into an envelope 150 in a direction generally indicated with reference numeral 173 such that the false bottom 125 is located adjacent to the envelope flap 154. Because the original address 152 is inverted, the envelope 150 is grasped by letter-size postal equipment along an envelope edge including envelope flap 154 such that the false bottom 125 resides in the grasped region. The assembly of mailer 120 and envelope 150 is forwarded by the postal service to a recipient at the original address 152. The recipient compromises the sealing strip 153 of envelope 150, extracts the mailer 120 for accessing the article 36a, and optionally discards the used envelope 150.

As shown in FIG. 15C, the mailer 120 may be configured to forward the article 36a to a recipient at the return address 157 without the use of envelope 150. To that end, the article 36a is inserted into the pocket 134 and flap 160 is folded along the score line 164 such at least a portion of the adhesive region 166 contacts panel 122 for adhesively bonding the flap 160 to the panel 122. This seals the article 36a inside the pocket 134 and effectively lengthens the height of the mailer 120 by the incremental height, $H_1$, of section 168. Because of the increased height, the mailer 120 is not handled by automated letter-sized processing equipment when in route to a recipient at the return address 157 and bypasses this equipment, which could potentially damage the article 36a during handling. Flap 160 operates in a manner similar to resizing flap 54 (FIGS. 1, 9) for increasing the height of mailer 120.

In certain embodiments, the incremental height, $H_1$, of section 168 of the deployed flap 160 increases the height of the mailer 120 to exceed 6⅛ inches, which is a current regulatory threshold for classifying mailpieces as letter-sized. However, the invention contemplates that the threshold height is related to prospective regulatory guidance and subject to future change. Therefore, in accordance with the present invention, the incremental increase in height provided by the flap 160 is a height increase adequate to change the height of the mailer 120 from a initial height (with the flap 160 stowed) that fits within the envelope 150 to a final height (when flap 160 is deployed) characterizing flat dimensions under postal regulations.

In alternative embodiments of the invention, the flap 160, as well as resizing flap 54, may be located along a side edge of mailer 120 so that the length of the mailer 120 can be extended to prevent handling by letter-sized postal processing equipment. For example, the deployed flap 160 may extend the length of mailer 120 to exceed 11½ inches, which is a current regulatory threshold for classifying mailpieces as letter-sized. Changing the length modifies the aspect ratio of the mailer 120 with the same result as changing the height. However, the invention contemplates that the threshold length is related to prospective regulatory guidance and subject to future change.

The invention also contemplates that an end user may maintain a stock of any of the mailers described herein, such as mailer 120, and use the mailers, at the discretion of the end user, with the resizing flap, such as flaps 160, either undeployed so that mailer is letter automation-compatible, or with the resizing flap deployed so that the mailer bypasses automated letter-sized processing equipment and has a height or length characterizing flat dimensions under postal regulations. This would provide a flexible stockpile of article mailers that can be selectively configured for handling either as a letter-sized mailpiece or as a flat mailpiece. When the resizing flap is not deployed, the mailer may be sent as a letter-size group of items that are handled collectively as a bulk mailing and, thus, are not exposed to the facer canceller.

Figure 16A:
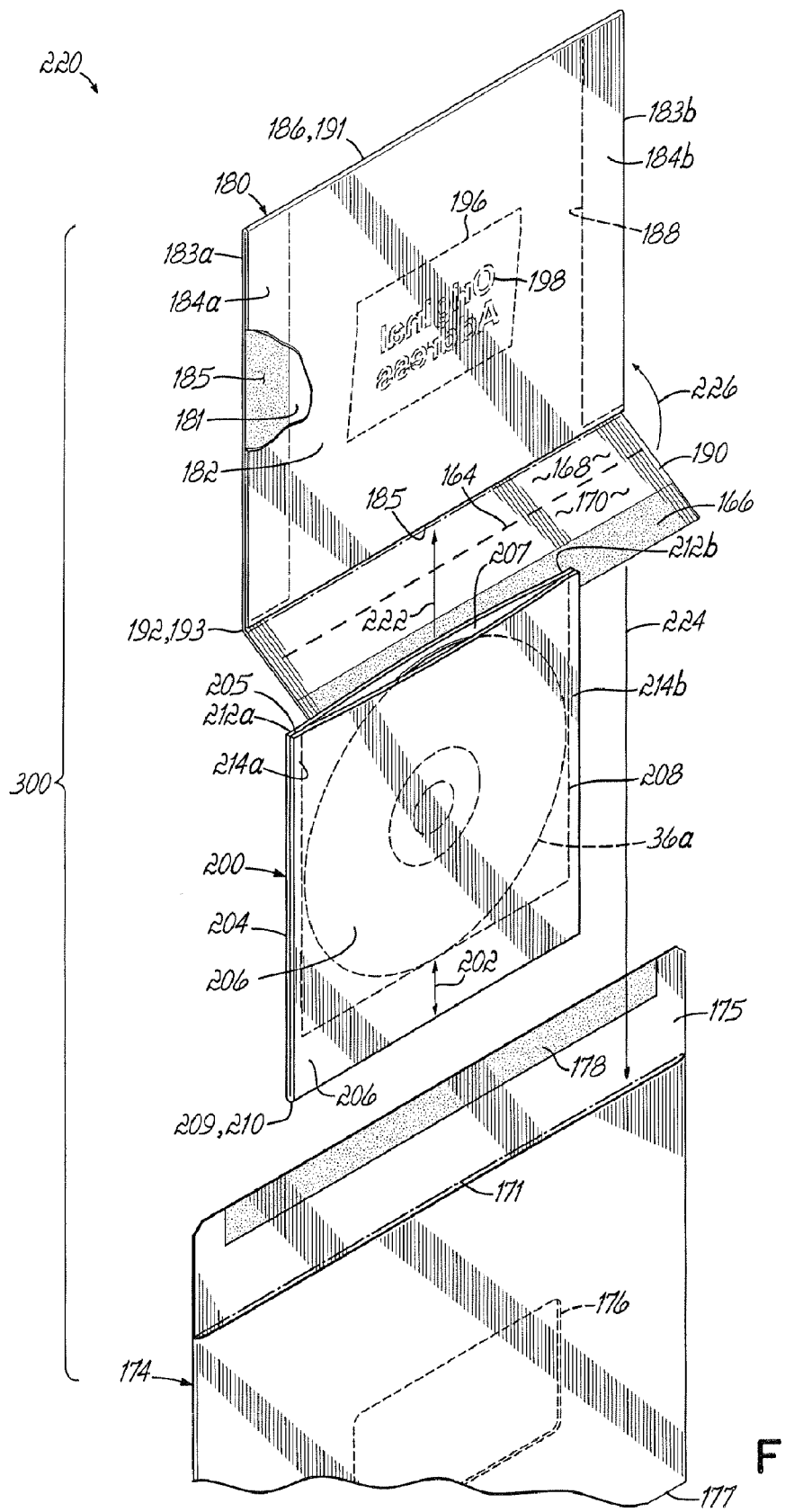
FIGS. 16A and 16B are front and rear perspective views of a mailer and an envelope in accordance with an alternative embodiment of the invention.

With reference to FIGS. 16A,B in which like reference numerals refer to like features in FIGS. 15A-C and in accordance with an alternative embodiment of the invention, an assembly 220 including an envelope 174 with a transparent or translucent window 176 or an aperture (not shown) in the envelope 174 that is unfilled by a window, a mailer 180 similar to mailer 120 (FIG. 15A), and a sleeve 200 that is inserted into mailer 180. Sleeve 200, which is similar to the embodiment of mailer 120 shown in FIG. 13, is configured to receive article 36a and the assembly of article 36a and sleeve 200 are inserted into mailer 180 to form another mailing member or assembly 300 for transporting article 36a. Envelope 174 includes a flap 175 bearing a sealing strip 178 used to seal the envelope 174 by folding flap 175 along fold line 171 with the sealing strip 178 activated and forming an adhesive bond between sealing strip 178 and a portion of envelope 174.

Mailer 180 differs from mailer 120 (FIG. 15A) in that the false bottom 125 (FIG. 15A) is absent. Instead, the sleeve 200 incorporates a false bottom 202 that positions article 36a relative to the envelope 174 and mailer 180 such that the article 36a will not be damaged or, at the least, is unlikely to be damaged by processing with automated processing equipment, as described herein. False bottom 202 is created by adhesively bonding, or otherwise joining by, for example, stapling, the panels 204, 206 of the sleeve 200 together in a manner similar to the adhesive bond that creates false bottom 125, as described herein. The panels 204, 206 are joined along a fold line 210, which defines an edge 209 of the bonded panels 204, 206. Defined between panels 204, 206 of sleeve 200 is a pocket 208 positioned between edge 209 and an opposite edge 205. An access opening 207 into pocket 208 is defined along or near edge 205 of the bonded panels 204, 206. The invention contemplates that the access opening 207 to pocket 208 may be defined along a side edge of the bonded panels 204, 206, wherein the sleeve 200 has two side edges joining edges 205, 209, so long as the pocket 208 is separated from edge 209 by false bottom 202. One boundary of the pocket 208 is supplied by the false bottom 202 and the lateral boundaries of the pocket 208 are defined by bonding or otherwise joining confronting strip sections 212a, 214a and 212b, 214b of the panels 204, 206 with, for example, adhesive (not shown).

The assembly 220 is formed by inserting the article 36a through access opening 207 and at least partially into a pocket 208. One boundary of the pocket 208 is supplied by the false bottom 202 and the lateral boundaries of the pocket 208 are defined by bonding or otherwise joining confronting strip sections 212a, 214a and 212b, 214b of the panels 204, 206 with, for example, adhesive (not shown). The pocket 208 confines the article 36a and lifts the article 36a away from edge 210.

Figure 16B:
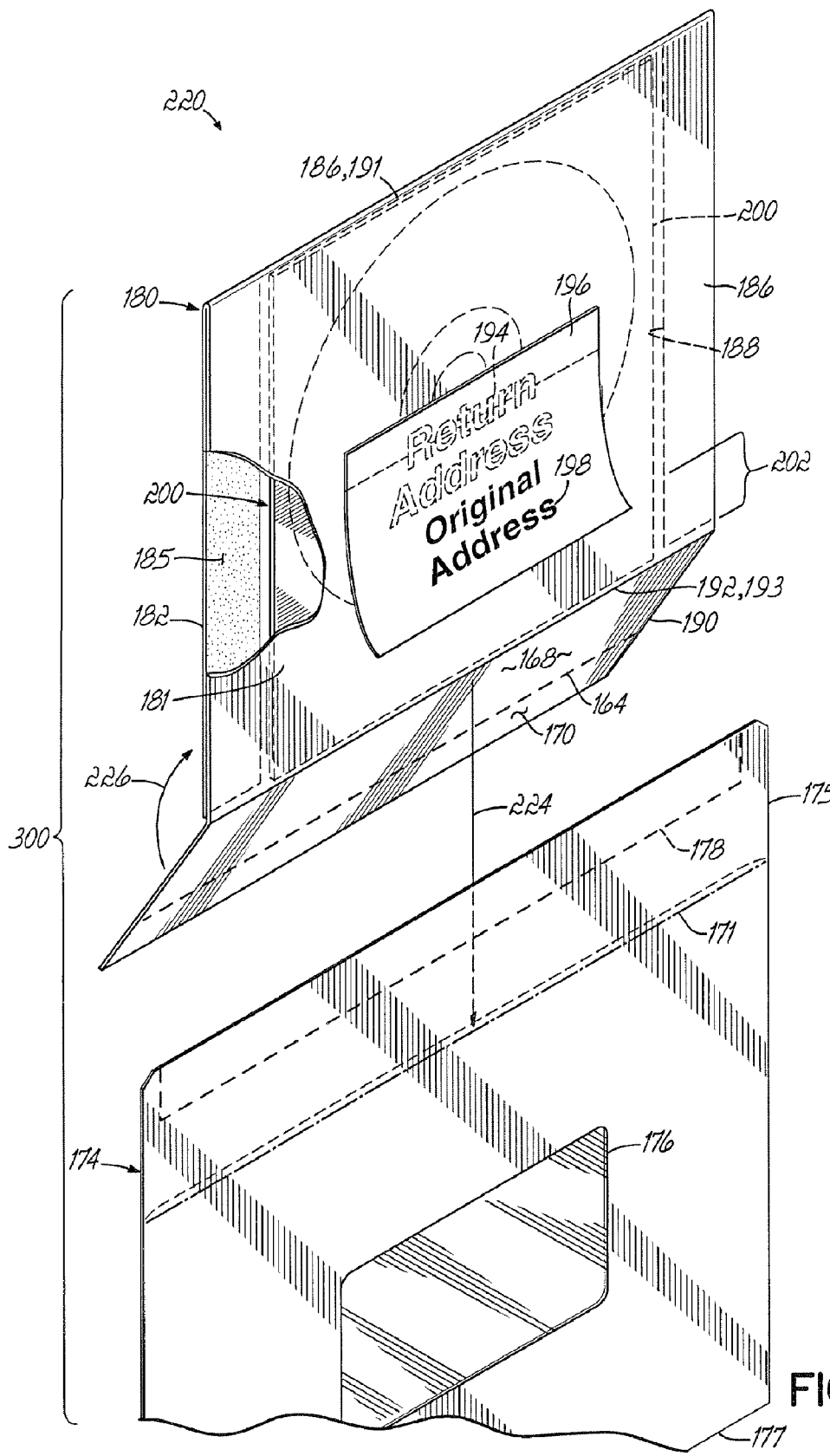

Mailer 180 includes panels 181, 182 that are bonded or otherwise joined along confronting strip sections 183a, 184a and 183b, 184b with, for example, adhesive 185 and joined along a fold line 186 to bound a pocket 188. The fold line 186 constitutes one edge 191 of the bonded panels 181, 182. A flap 190, which is identical or substantially similar in construction and function to flap 160 (FIGS. 15A-C), is attached to panel 181 along a fold line 192, which constitutes a second edge 193 of the bonded panels 181, 182. Consequently, flap 190 may be beneficial for using the mailer 180 to forward the article 36a to a return address 194 (FIG. 16B). The mailer 180 includes an access opening 185 to the pocket 188 defined near or along edge 193 through which the article 36a is inserted into pocket 188 and removed from pocket 188. The invention contemplates that the access opening 185 to pocket 188 may be defined along a different edge of the bonded panels 181, 182, so long as the sleeve 200 is inserted into pocket 188 with a suitable orientation of false bottom 202.

Mailer 180 also includes a removable label 196 that bears an outbound or original address 198. Initially and as best shown in FIG. 16B, the return address 194 is covered or otherwise obscured by the label 196 during the outbound mailing so that only the original address 198 is visible. In one embodiment, the label 196 is a thin trapezoidal sheet of, for example, paper stock that is adhesively bonded in a removable manner to panel 181 of the mailer 180. For example, the label 196 may be removably bonded to panel 181 along a edge strip by a low strength pressure sensitive adhesive. During transfer to the recipient at the original address 198, the envelope protects the removable label 196.

In use, the article 36a is inserted into the pocket 208 of sleeve 200, which is preferably dimensioned to at least partially and, preferably, fully receive the article 36a so that the article 36a is at least partially hidden. This assembly is then inserted into the pocket 188 of mailer 180 in a direction indicated by the single-headed arrow 222 to form another assembly. Pocket 188 is preferably dimensioned to at least partially and, preferably, fully receive that sleeve 200 so that the sleeve 200 is at least partially hidden. The orientation of the original address 198 determines the orientation in which the sleeve 200 is inserted into mailer 186. The flap 190 is C-folded in the direction indicated by single-headed arrow 226 so that flap 190 contacts panel 182.

This assembly is then inserted flap-first into the envelope 174 with the fold line 192 defining the leading end in a direction indicated by the single-headed arrow 224 to create assembly 220. The envelope 174 and mailer 180 are arranged, and the window 176 positioned in envelope 174, such that the original address 198 is visible through the window 176 to an observer outside the envelope. This arrangement also places the false bottom 202 of the sleeve 200 adjacent to an edge 177 of the envelope 174. The false bottom 202 ensures that the article 36a will not be damaged by processing with automated processing equipment, as described herein, when the envelope 174 is contacted across regions near the edge 177 by automated postal equipment. The orientation of the original address 198 determines which edge of the envelope 174 is a bottom edge. After the flap 175 of envelope 174 is sealed using sealing strip 178, the envelope 174 is dispatched through the postal service to a recipient at the original address 198.

The recipient at the original address 198 compromises the sealing strip 178 to remove the assembly of the article 36a, the sleeve 200, and the mailer 180 and proceeds to remove the article 36a from the sleeve 200. The envelope 174 may be discarded. The original recipient may forward the mailer 180, along with sleeve 200 and article 36a, through the postal service to another recipient at the return address 194. To do so, the original recipient removes the label 196 to reveal the return address 194 and, after inserting article 36a into sleeve 200 and inserting this assembly into mailer 180, deposits the assembly with the postal service for delivery to the recipient at the return address 194. The flap 190 may be deployed so that the postal service does not handle the mailer 180 with automated letter-sized equipment, which protects article 36a against damage during handling and transport. Consequently, the orientation of the sleeve 200 within the mailer 180 does not determine article safety during this phase of handling by the postal service.

Figure 16C:
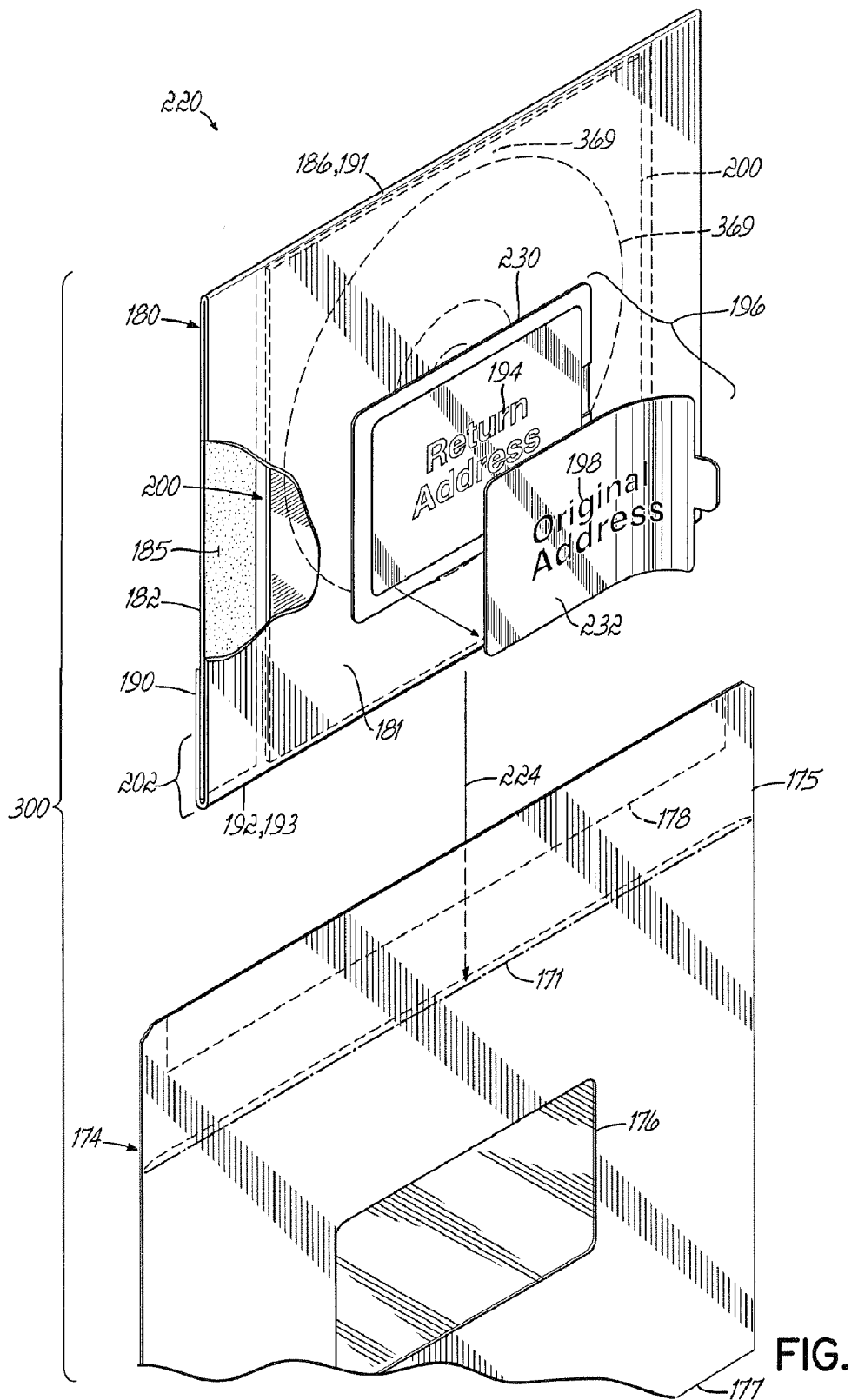
FIG. 16C is a perspective view similar to FIGS. 16A,B in accordance with an alternative embodiment of the invention.

With reference to FIG. 16C in which like reference numerals refer to like features in FIGS. 15A,B and in accordance with an alternative embodiment of the invention, the label 196 on mailer 180 may comprise a piggyback label having a first panel 230 that is strongly bonded to the mailer 180 and a removable second panel 232 that is removably bonded with panel 230. Panel 230 carries the return address 194 and panel 232 carries the original address 198. The label 196 is positioned on the mailer 180 such that the original address 198 is visible through window 176. This embodiment of the mailer 180 is assembled to form assembly 220 and delivered in envelope 174 to the original address 198 by the postal service as described above. The recipient at the original address 198 can forward the mailer 180 to a third party at the return address 194 by removing panel 232 to reveal the return address 194 and depositing the sealed mailer 180 with the postal service. Flap 190 is deployed to ensure that the mailer 180 is not damaged during handling by automated letter-sized equipment at the postal service.

The invention contemplates, as appreciated by persons of ordinary skill in the art, that the removable label 196 and envelope 170 may be used in conjunction with the embodiments of the present invention shown in FIGS. 13, 14A-C and 15A-C.

Figure 17A:
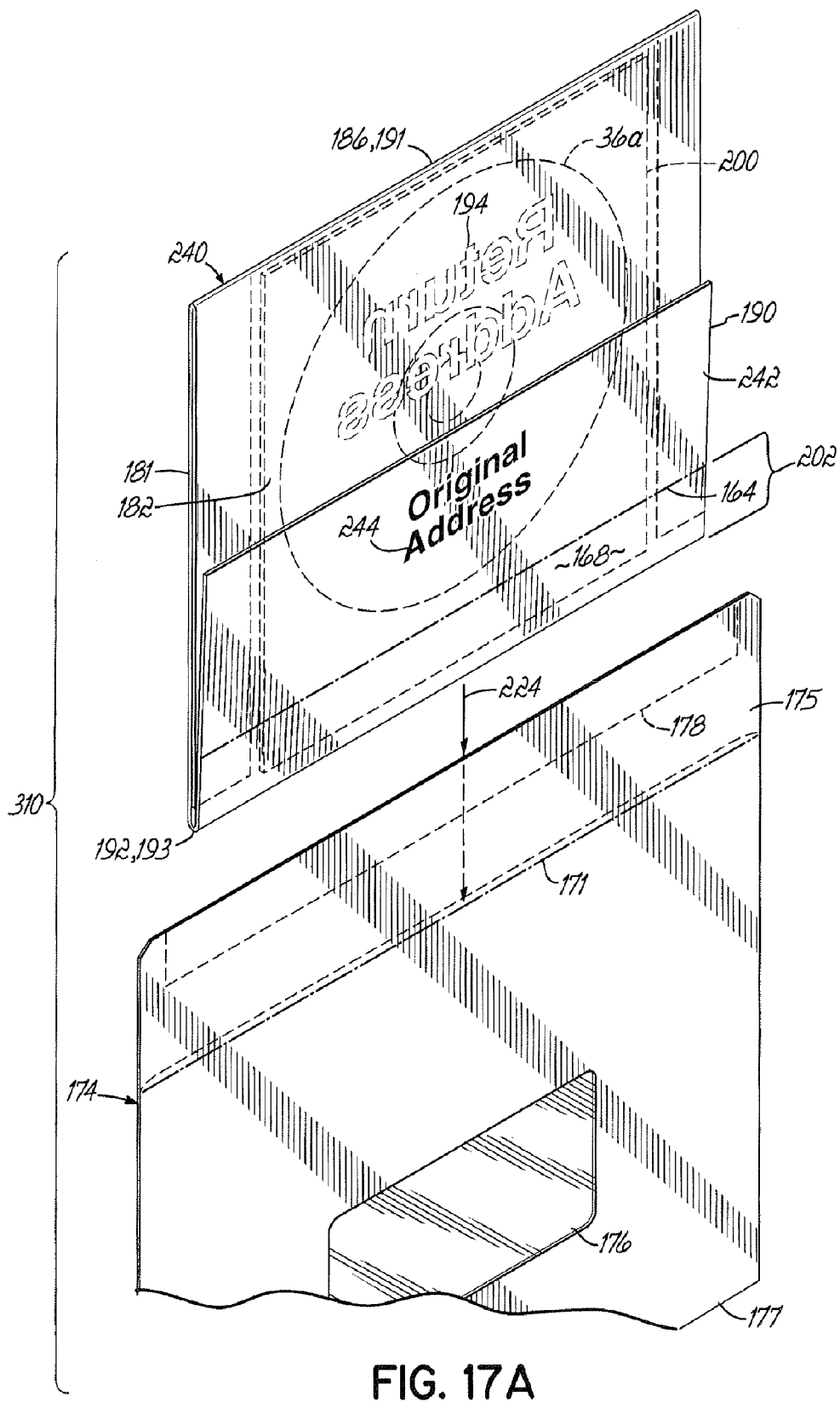
FIG. 17A is a perspective view of a mailer for an article with a C-fold flap configuration and an envelope in accordance with an alternative embodiment of the invention.

With reference to FIG. 17A in which like reference numerals refer to like features in FIGS. 16A,B and in accordance with an alternative embodiment of the invention, a mailer 240 differs from mailer 180 (FIG. 15A) in that the label 196 (FIGS. 16A,B) is absent and in that flap 190 (FIGS. 16A,B) include a section 242 that replaces section 170 (FIGS. 16A, B). The envelope 174, sleeve 200, and mailer 240 constitute a mailing member or assembly 310 for transporting article 36a. Mailer 240 Section 242 is extended in height in comparison with section 170. An original address 244 is printed directly on section 242 and the return address 194 is printed directly on panel 181 of the mailer 180. Flap 190 is C-folded to place the original address 244 at a readable location visible through window 176. The mailer 240 is inserted into envelope 174 such that the original address 244 is visible through window 176 when mailed to the original address 244. Mailer 240, containing the assembly of article 36a and sleeve 200, operates in a similar manner to mailer 180 and sleeve 200 to protect the article 36a against damage during handling by the postal service.

The recipient may optionally obscure the original address 244 with, for example, a marker and deposit the sealed mailer 180 for dispatch to another recipient at the return address 194. As explained above, flap 190 is configured such that the postal service does not handle the assembly of mailer 240 and sleeve 200 with letter-sized automated postal equipment, so as to protect article 36a against damage during handling and transport to a recipient located at the return address 194.

Figure 17B:
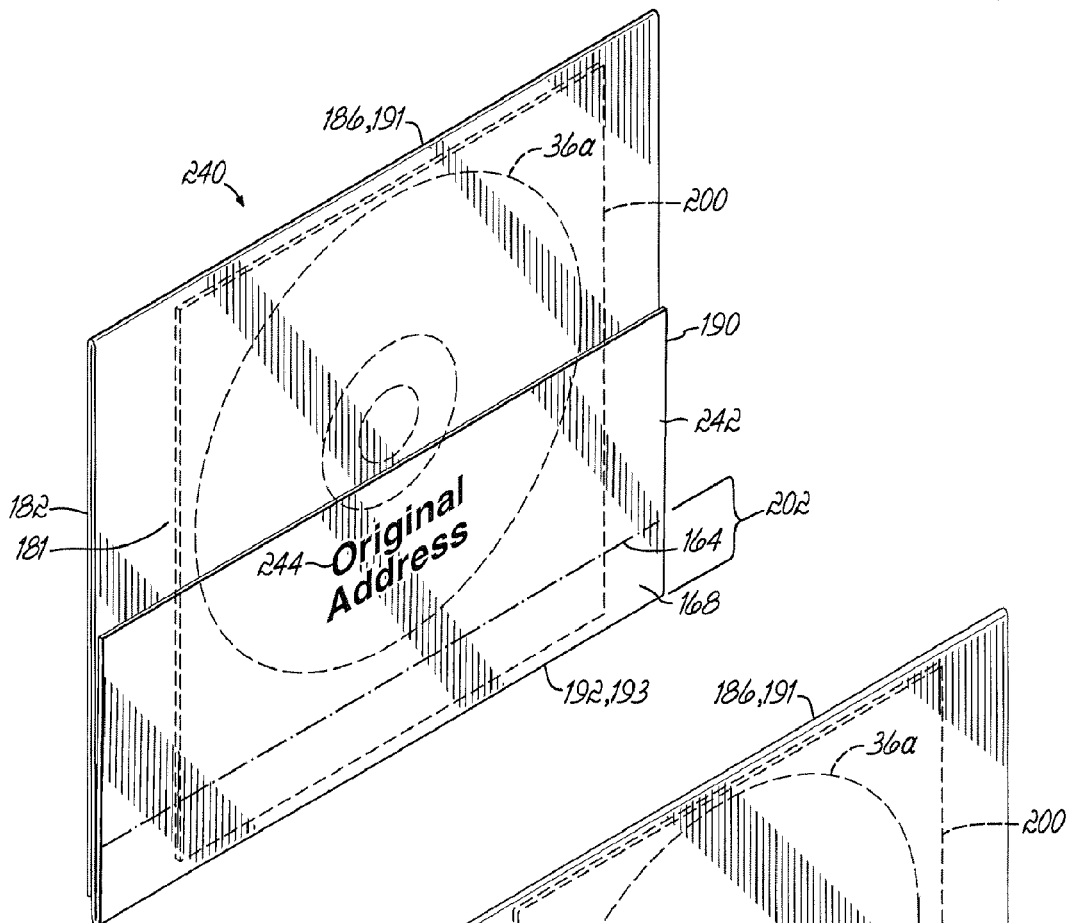
FIG. 17B is a perspective view similar to FIG. 17A of a mailer for an article with a Z-fold flap configuration and an envelope in accordance with an alternative embodiment of the invention.
Figure 17C:
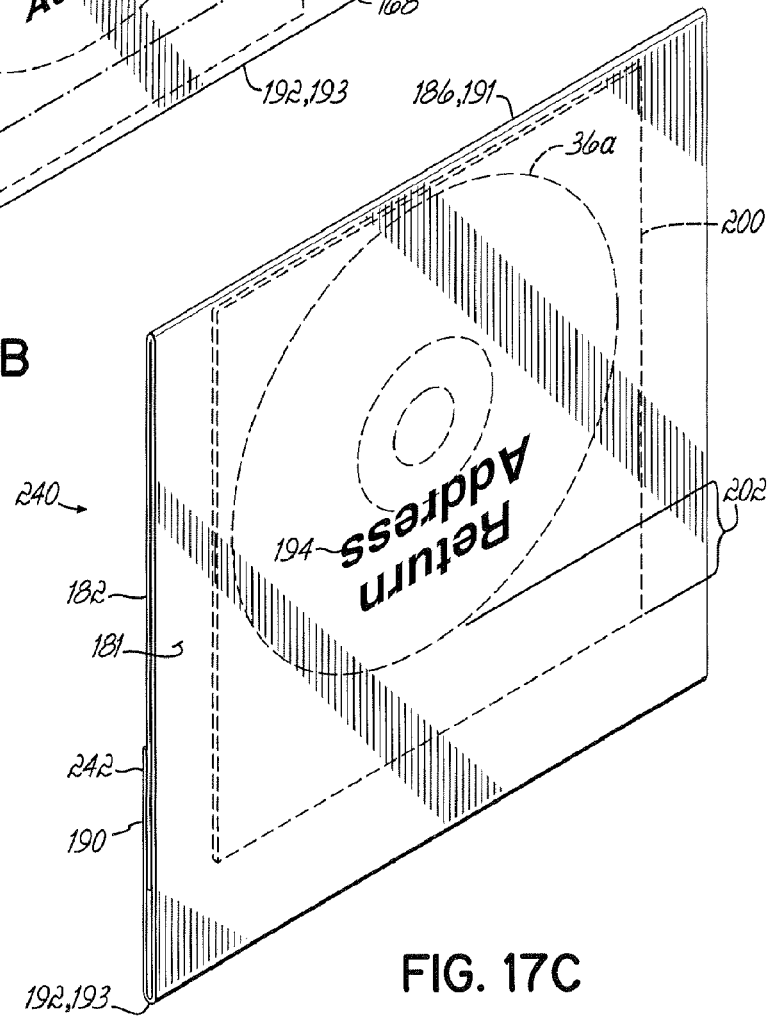
FIG. 17C is a perspective view of the mailer of FIG. 16B configured for mailing to a recipient at a return address.

With reference to FIGS. 17B,C in which like reference numerals refer to like features in FIG. 17A and in accordance with an alternative embodiment of the invention, the original address 244 may be printed on a surface of section 242 that is visible through window 176 when the flap 190 is Z-folded and the mailer 240 is placed inside envelope 174 for outbound mailing to a recipient at the original address 244, as shown in FIG. 17B. The mailer 240 is thus configured for forwarding to a recipient at the return address 194, as shown in FIG. 17C, by reverse folding the flap 190 to assume a C-folded arrangement with panel 182. In this C-folded arrangement, the surface of section 242 bearing the original address 244 faces panel 182 so that the original address 244 is hidden.

Flap 190 may then be deployed, at the discretion of the recipient, to forward the article 36a to another recipient located at the return address 194, as explained above. The deployed flap 190 prevents the postal service from handling mailer 240 with automated letter-sized equipment, which protects article 36a against damage during handling and transport.

Figure 18:
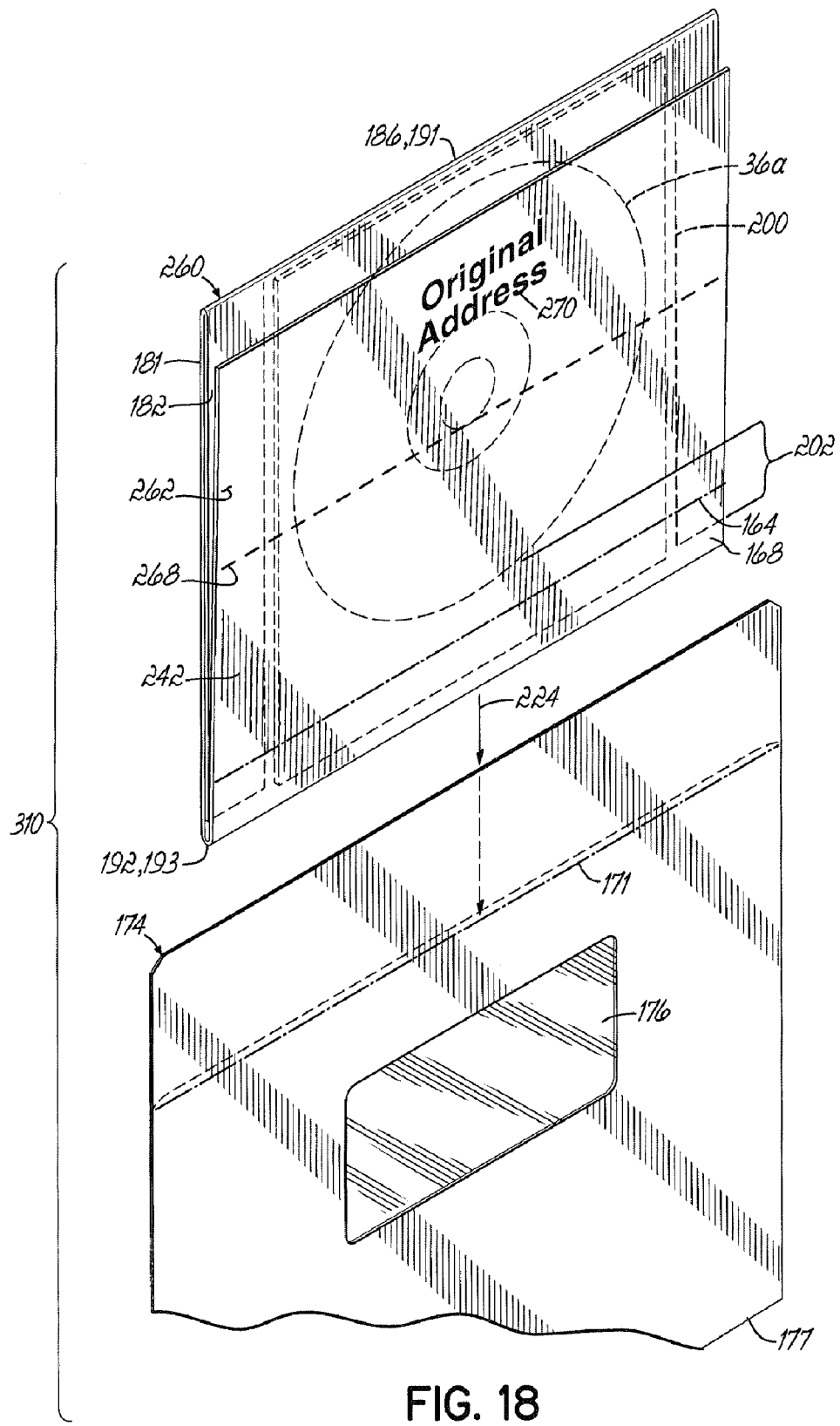
FIG. 18 is a perspective view of a mailer for an article with a C-fold flap configuration and an envelope in accordance with an alternative embodiment of the invention.

With reference to FIG. 18 in which like reference numerals refer to like features in FIGS. 17A and in accordance with an alternative embodiment of the invention, a mailer 260 differs from mailer 240 (FIG. 17A) in that section 262 is added to section 242 (FIG. 17A). Section 262 is joined along a perforated score line 268 with section 242 and is removable from section 242. An original address 270 is printed directly on section 262, as opposed to being printed onto section 242. The mailer 260 is inserted into envelope 174, with the section 262 folded against panel 182. The original address 270 is positioned on a surface of section 262 so that original address 270 is visible through window 176 in the C-folded arrangement. Mailer 260 and sleeve 200 operates in a similar manner to mailer 240 and sleeve 200 to protect the article 36a against damage during handling by the postal service. The assembly of sleeve 200, mailer 260, and envelope 174 is deposited in the mail for delivery to a recipient at the original address 270.

The recipient may optionally dispatch the article 36a to another recipient at the return address 194 (not shown) by removing the removable section 262 by manipulation of the score line 268 sufficient to scission section 262 along score line 268. As explained above, flap 190 is configured such that the postal service does not handle mailer 260 with automated letter-sized equipment, so as to protect article 36a against damage during handling and transport. In an alternative embodiment of the present invention, flap 190 may be Z-folded, so that section 242 contacts panel 181 when placed inside envelope 174, to situate the original address 270 at a location readable through the window 174. The folding is similar to the folding of mailer 240 shown in FIG. 17B.

The mailers and sleeves described herein may be formed from any suitable material, such as plastic, paper stock or cardboard, and may be fabricated from a larger sheet of material by any suitable process, such as die cutting. The material may have a stiffness sufficient to withstand processing in automated mail processing equipment without sustaining significant damage, yet lightweight for purposes of manufacturability and to minimize mailing costs.

In accordance with the present invention, the false bottom, whether in one of the mailers or incorporated into one of the sleeves, provides lift that significantly reduces the risk that the pocket-held article will be contacted during postal processing to an extent sufficient to damage the article. Generally, regardless of how the mailer, either with or without a sleeve is inserted into an envelope, the false bottom is beneath the original address. In other words, the false bottom is contacted by regions of the transport belts, spindles, and drums of the processing equipment such that the held article is unlikely to be damaged by the resulting contact.

While the present invention has been illustrated by the description of embodiments example thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method for mailing an article using a mailing member having a false bottom adapted to space the pocket from a first edge of the mailing member and an envelope having an access opening, a width, a length greater than the width, and a bottom separated from the opening by the width, the method comprising:
    placing the article into a pocket defined between adjacent panels of the mailing member; and
    after the article is placed inside the pocket, mechanically gripping the false bottom of the mailing member to insert the mailing member into the access opening of the envelope and with an original address visible from the exterior of the envelope,
    wherein the original address is aligned with the length of the envelope, and the mailing member is oriented relative to the envelope during insertion such that the false bottom is inserted last to be disposed inside the envelope between the original address and the access opening or the false bottom is inserted first to be disposed inside the envelope between the original address and the bottom of the envelope.

2. The method of claim 1 further comprising:
    removing the mailing member from inside the envelope; and
    after the mailing member is removed from inside the envelope, configuring the mailing member to forward the mailing member to a return address by increasing either a height or a width of the mailing member.

3. The method of claim 1 further comprising:
    removing the mailing member from inside the envelope;
    after the mailing member is removed from inside the envelope, deploying a resizing flap to increase either a height or a width of the mailing member; and
    after the resizing flap is deployed, mailing the mailing member to another party.

4. The method of claim 1 wherein mechanically gripping the false bottom of the mailing member comprises:
    clamping opposite sides of the mailing member along the false bottom.

5. The method of claim 1 wherein the original address is located on the envelope and is inverted relative to the bottom of the envelope, and mechanically gripping the false bottom of the mailing member further comprises:
    inserting the mailing member into the envelope so that the false bottom is located between the original address and the access opening.

6. The method of claim 1 wherein the original address is located on the envelope and is upright relative to the bottom of the envelope, and mechanically gripping the false bottom of the mailing member further comprises:
    inserting the mailing member into the envelope so that the false bottom is located between the original address and the bottom.

7. The method of claim 1 wherein the mailing member includes a second edge along which the pocket is open and a flap on the second edge that is used to close the pocket after the article is inserted, and the flap on the second edge of the mailing member is inserted into the envelope before the first edge.

8. The method of claim 1 wherein the mailing member includes a second edge along which the pocket is open and a flap on the second edge that is used to close the pocket after the article is inserted, and the flap on the second edge of the mailing member is inserted into the envelope after the first edge.

9. The method of claim 8 wherein the mailing member includes a pair of panels that converge at the first edge, and further comprising:
    applying an amount of a substance on the flap that hold the flap in proximity to one of the panels during insertion into the envelope.

10. The method of claim 1 wherein placing the article into a pocket defined between adjacent panels of the mailing member comprises:
    using a mechanical inserter to insert the article into the pocket.

11. The method of claim 1 further comprising:
    deploying a resizing flap to increase either a height or a width of the mailing member.

* * * * *

UNITED STATES PATENT AND TRADEMARK OFFICE
CERTIFICATE OF CORRECTION

PATENT NO. : 7,669,389 B2  Page 1 of 1
APPLICATION NO. : 11/160496
DATED : March 2, 2010
INVENTOR(S) : Todd N Butler It is certified that error appears in the above-identified patent and that said Letters Patent is hereby corrected as shown below:

In line 4 of the abstract in column 2 of the cover page, change "is" to --and--.

In column 2:
Line 7, before "meet", insert --not--
Line 32, change "positions" to --position--.

In column 7:
Line 15, change "approximate" to --approximately--
Line 17, before "deployed", insert --is--.

In column 13, line 17, change "is" to --are--.

In column 15, line 63, before "proximate", delete "in".

In column 17:
Line 2, after "such", insert --that--
Line 57, change "including" to --includes--.

In column 20, line 14, change "include" to --includes--.

In column 21, line 2, change "operates" to --operate--.

Signed and Sealed this

Thirteenth Day of July, 2010

David J. Kappos
*Director of the United States Patent and Trademark Office*